United States Patent
Ando et al.

(10) Patent No.: US 10,234,544 B2
(45) Date of Patent: Mar. 19, 2019

(54) LASER RADAR DEVICE

(71) Applicant: Mitsubishi Electric Corporation, Tokyo (JP)

(72) Inventors: Toshiyuki Ando, Tokyo (JP); Eisuke Haraguchi, Tokyo (JP); Jiro Suzuki, Tokyo (JP); Shumpei Kameyama, Tokyo (JP); Junya Nishioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 490 days.

(21) Appl. No.: 15/036,252

(22) PCT Filed: Dec. 8, 2014

(86) PCT No.: PCT/JP2014/082454
§ 371 (c)(1),
(2) Date: May 12, 2016

(87) PCT Pub. No.: WO2015/087842
PCT Pub. Date: Jun. 18, 2015

(65) Prior Publication Data
US 2016/0291135 A1    Oct. 6, 2016

(30) Foreign Application Priority Data

Dec. 9, 2013    (WO) .................. PCT/JP2013/082979

(51) Int. Cl.
*G01C 3/08*    (2006.01)
*G01S 7/481*   (2006.01)
(Continued)

(52) U.S. Cl.
CPC ............. *G01S 7/4811* (2013.01); *G01S 7/483* (2013.01); *G01S 17/58* (2013.01); *G01S 17/95* (2013.01); *Y02A 90/19* (2018.01)

(58) Field of Classification Search
CPC ........ G01S 7/4811; G01S 7/483; G01S 17/58; G01S 17/95; Y02A 90/19
See application file for complete search history.

(56) References Cited

U.S. PATENT DOCUMENTS

| | | | |
|---|---|---|---|
| 2001/0009469 A1 | 7/2001 | Shimizu et al. | |
| 2009/0297155 A1* | 12/2009 | Weiner | H04B 1/40 398/115 |

(Continued)

FOREIGN PATENT DOCUMENTS

| | | |
|---|---|---|
| JP | H04-369421 A | 12/1992 |
| JP | H10-336154 A | 12/1998 |

(Continued)

OTHER PUBLICATIONS

International Search Report for PCT/JP2014/082454 dated Feb. 10, 2015.

*Primary Examiner* — Samantha K Abraham
(74) *Attorney, Agent, or Firm* — Studebaker & Brackett PC

(57) ABSTRACT

An optical transmitter 1 includes an optical phase modulator 131 that performs phase modulation on a continuously oscillating light, a light intensity modulator 132 that performs pulse modulation on the light on which the phase modulation is performed, to output the light as a transmission light, a first signal generator 133 that generates a pulse modulation driving signal in which on and off time intervals are repeated periodically, to drive the optical intensity modulator 132, and a second signal generator 134 that generates a saw tooth wave driving signal having an amplitude equal to an integral multiple of a driving voltage needed to acquire a modulation phase of $2\pi$ of the optical phase modulator 131, and having a constant period, to drive the optical phase modulator 131.

11 Claims, 20 Drawing Sheets

(51) Int. Cl.
*G01S 17/58* (2006.01)
*G01S 17/95* (2006.01)
*G01S 7/483* (2006.01)

(56) References Cited

U.S. PATENT DOCUMENTS

| | | | |
|---|---|---|---|
| 2010/0014874 A1* | 1/2010 | Kawanishi | G02F 1/225 |
| | | | 398/187 |
| 2012/0257197 A1* | 10/2012 | Feldkhun | G01N 21/4795 |
| | | | 356/301 |
| 2014/0233013 A1 | 8/2014 | Sakimura et al. | |

FOREIGN PATENT DOCUMENTS

| | | |
|---|---|---|
| JP | 2000-193558 A | 7/2000 |
| JP | 2007-085756 A | 4/2007 |
| JP | 2010-151806 A | 7/2010 |
| JP | 4785475 B2 | 10/2011 |
| WO | 2013/094431 A1 | 4/2015 |

* cited by examiner

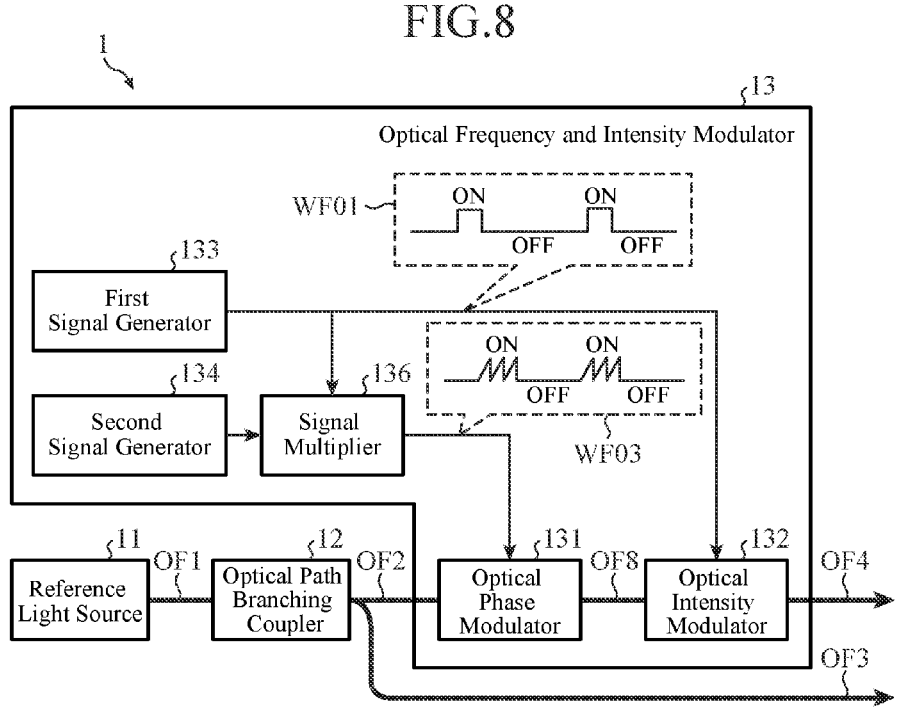
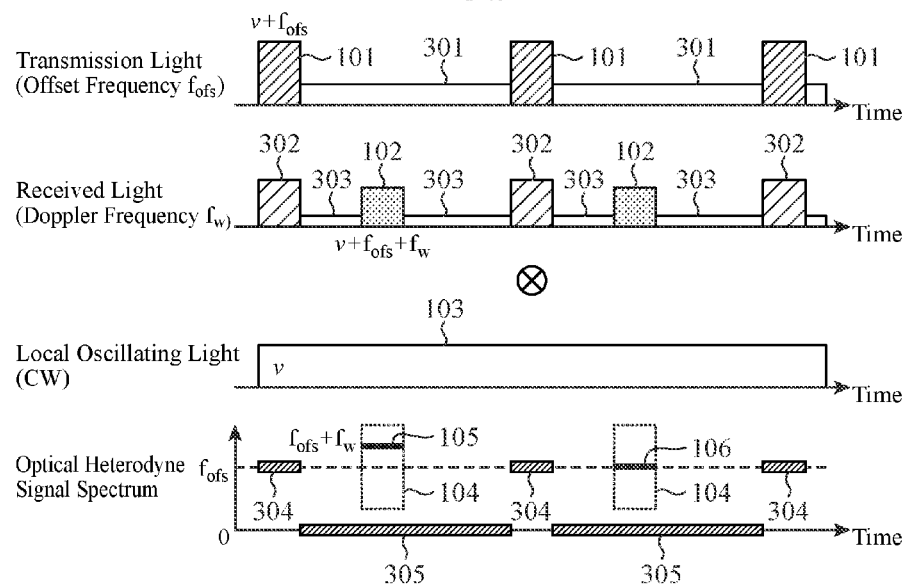

FIG.29
(a)
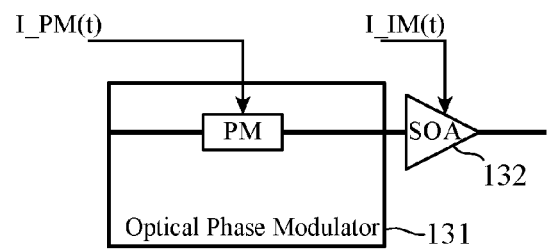
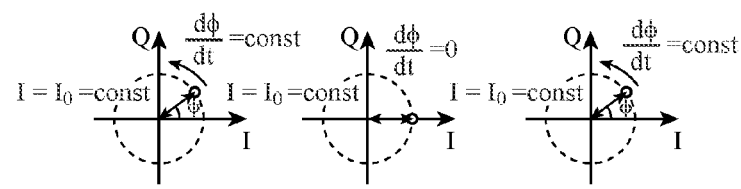
(b)
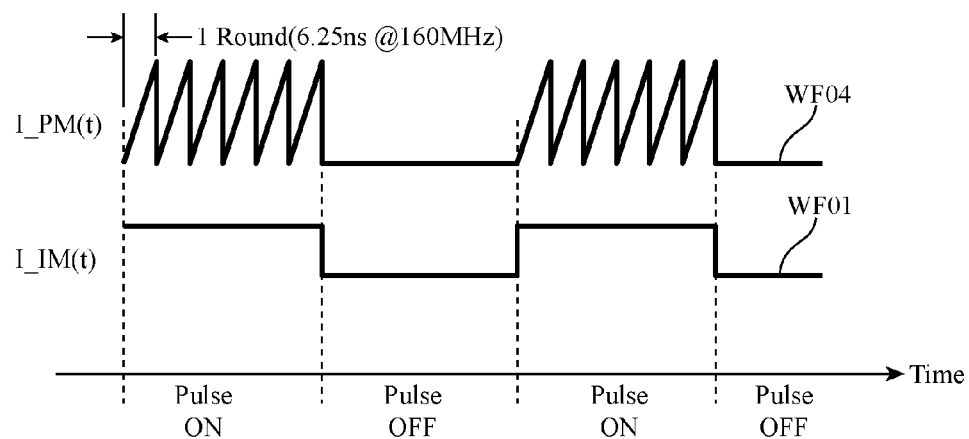

LASER RADAR DEVICE

FIELD OF THE INVENTION

The present invention relates to a laser radar device that performs remote measurement of wind directions and speeds in, for example, weather space.

BACKGROUND OF THE INVENTION

Patent reference 1 discloses a laser radar device that transmits a pulse-shaped transmission light along an optical scan axis, analyzes a Doppler frequency light signal included in received light based on this transmission light, and measures the wind speed and so on in the direction of the optical scan axis. This laser radar device includes an analyzing circuit that converts the Doppler frequency light signal into a Doppler frequency electric signal, and analyzes this Doppler frequency electric signal.

Further, a laser radar device that measures wind directions and speeds uses a light intensity modulation unit within a transmitting unit, in order to pulse transmission light. However, in an acousto optic modulator (AO modulator) that is used for this light intensity modulation unit, carrier leak light resulting from the reverberation of an ultrasonic signal for modulation occurs. This carrier leak light then induces a beat signal unnecessary for an optical heterodyne receiver.

Because this unnecessary beat signal coincides with the Doppler signal to be measured in the frequency domain, there is a disadvantage that it becomes impossible to estimate the Doppler frequency correctly.

As a measure against the disadvantage, in the laser radar device disclosed by patent reference 1, an optical circulator is placed as a stage preceding the input end of the light intensity modulation unit, and a total reflection mirror is placed as a stage following the output end of the light intensity modulation unit. As a result, the light can be caused to make a round trip in the light intensity modulation unit, and the carrier leak light during pulse off time intervals can be reduced.

RELATED ART DOCUMENT

Patent Reference

Patent reference 1: Japanese Unexamined Patent Application Publication No. 2007-85756

SUMMARY OF THE INVENTION

Problems to be Solved by the Invention

In a conventional laser radar device that measures wind directions and speeds, in order to reduce carrier leak light during pulse off time intervals, an optical circulator and a total reflection mirror for causing light to make a round trip in a light intensity modulation unit are needed. Therefore, a problem arises in the cost reduction and the reliability as a result of an increase in the component count and also an increase in the number of points requiring an optical axis adjustment.

Further, a round trip of the light in the light intensity modulation unit causes an increase in the insertion loss. Therefore, in order to compensate for this insertion loss, a measure for increasing the power of a reference light source placed as a preceding stage or increasing the gain of an optical amplifier placed as a following stage, or the like is needed. Therefore, a problem arises in the reduction of power consumption and the cost reduction.

In addition, in a conventional laser radar device that measures wind directions and speeds, in order to detect the positive and negative of the wind speed (a head wind and a following wind) in the direction along the optical scan axis, it is necessary to add an offset frequency to the transmission light during each pulse on time interval. Therefore, an AO modulator having a frequency shift function is used for the light intensity modulation unit.

This AO modulator excites an ultrasonic wave in the medium thereof and causes the ultrasonic wave to propagate through the medium, by applying a high-frequency voltage to a transducer, such as a piezo, mounted to an end surface of a glass substrate or an acousto-optic crystal. When the inside of the medium is made to vibrate by means of the ultrasonic wave, a periodical structure of large and small refractive indexes is generated and propagates at the speed of the ultrasonic wave. By putting a reflection-free termination to the opposite end face of the transducer, which is the medium, in an ultrasonic absorption band, the AO modulator looks as if a phase grating moves in a certain direction at the speed of the ultrasonic wave.

When light is incident upon the AO modulator, emitted light not only changes its traveling direction due to a Bragg diffraction in the phase grating occurring in the medium, but also receives a Doppler shift according to the movement of the phase grating. By turning on and off a high frequency signal applied to the transducer, a fixed frequency shift can be added to the light during each pulse on time interval at the same time when pulsed light is extracted.

The Bragg angle $\theta$ of the acousto optic device is shown by the following equation in which the wavelength of the light is expressed by $\lambda$, the offset frequency is expressed by $f_{ofs}$, and the traveling speed of the ultrasonic wave in the acousto optic device is expressed by $v_a$.

$$\theta = \frac{\lambda \cdot f_{ofs}}{2 \cdot v_a}$$

In the case of $\lambda=1.55$ [μm], $f_{ofs}=80$ [MHz], and $v_a=3.63$ [mm/μs] as an example of a typical AO modulator, the Bragg angle $\theta$ is 17 [mrad] and is equal to about 1 degrees.

However, in the AO modulator for use in the above-mentioned laser radar device, the Bragg diffraction angle is as small as less than 1 degree. Therefore, the propagation distance needs to be at least 30 [mm] in order to optically separate zero-order transmitted light and first-order diffracted light, and the AO modulator is not suitable for downsizing and integration.

Further, it is necessary to make a high-precision adjustment to each of six axes (a translation position and angles) in such a way that the optical axes of the acousto optics crystal, and the incident light and the emitted light are aligned with the Bragg diffraction angle, and it is therefore difficult to reduce the cost for assembly and adjustment.

In addition, the Bragg angle $\theta$ varies dependently upon the light wavelength $\lambda$. In order to reduce the displacement of the optical axis at each of the input and output ends due to variations in the Bragg angle (and an increase in the insertion loss which is caused by the displacement), it is necessary to control the center wavelength of the reference light source to a constant wavelength, and therefore this results in an increase in the cost.

The present invention is made in order to solve the above-mentioned problems, and it is therefore an object of the present invention to provide a laser radar device that performs a frequency shift and pulsing, which are needed for a transmit side, without using an AO modulator, thereby being able to achieve downsizing and integration thereof, and an improvement in the reliability and a cost reduction according to a reduction in the component count.

Means for Solving the Problem

In accordance with the present invention, there is provided a laser radar device provided with an optical transmitter to output both a local oscillating light which is a continuously oscillating light and a transmission light, an optical antenna to emit the transmission light outputted by the optical transmitter into space, and to receive, as a received light, a backscattered light associated with that transmission light, an optical heterodyne receiver to perform optical heterodyne detection by using both the local oscillating light outputted by the optical transmitter and the received light received by the optical antenna, and a signal processor to perform a frequency analysis on the result of the detection performed by the optical heterodyne receiver, in which the optical transmitter includes: an optical phase modulator to perform phase modulation on the continuously oscillating light; an optical intensity modulator to perform pulse modulation on the light on which the phase modulation is performed by the optical phase modulator, to output the light as the transmission light; a first signal generator to generate a pulse modulation driving signal in which on and off time intervals are repeated periodically, to drive the optical intensity modulator; a second signal generator to generate a saw tooth wave driving signal having an amplitude equal to an integral multiple of a driving voltage needed to acquire a modulation phase of $2\pi$ of the optical phase modulator, and having a constant period, to drive the optical phase modulator; and a third signal generator that outputs a burst-like saw tooth wave driving signal in which portions corresponding to the pulse on time intervals of the pulse modulation driving signal generated by the first signal generator are extracted from the saw tooth wave driving signal generated by the second signal generator, to drive the optical phase modulator on behalf of the second signal generator.

Advantages of the Invention

Because the laser radar device in accordance with the present invention is constructed as above, the laser radar device performs a frequency shift and pulsing, which are needed for the transmit side, without using an AO modulator, thereby being able to achieve downsizing and integration thereof, and an improvement in the reliability and a cost reduction according to a reduction in the component count.

BRIEF DESCRIPTION OF THE FIGURES

FIG. 8 is a block diagram showing the structure of an optical transmitter of a laser radar device in accordance with Embodiment 3 of the present invention;

FIG. 9 is a diagram showing the timing diagram of each light in the laser radar device in accordance with Embodiment 3 of the present invention;

FIG. 29 is a diagram explaining the operation of an optical phase modulator of the laser radar device in accordance with Embodiment 3 of the present invention.

EMBODIMENTS OF THE INVENTION

Hereafter, the preferred embodiments of the present invention will be explained in detail with reference to the drawings.

Embodiment 1

Figure 1:
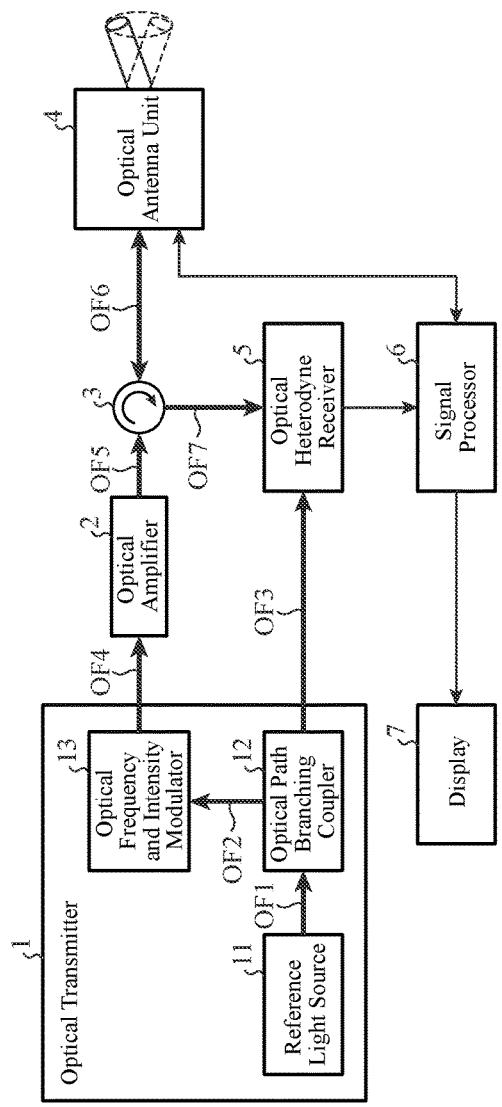
FIG. 1 is a block diagram showing the structure of a laser radar device in accordance with Embodiment 1 of the present invention.

FIG. 1 is a block diagram showing the structure of a laser radar device in accordance with Embodiment 1 of the present invention.

The laser radar device is comprised of an optical transmitter 1, an optical amplifier 2, an optical circulator 3, an optical antenna unit (an optical antenna) 4, an optical heterodyne receiver 5, a signal processor 6 and a display 7, as shown in FIG. 1. In FIG. 1, thick lines OF1 to OF7 denote transmission lines for light signals, and thin lines denote transmission lines for electric signals.

The optical transmitter 1 outputs both a local oscillating light which is a continuously oscillating and fixedly polarized light (a continuously oscillating light), and a transmission light on which pulse modulation in which on and off time intervals are repeated periodically is performed. This optical transmitter 1 is comprised of a reference light source 11, an optical path branching coupler 12, and an optical frequency and intensity modulator 13.

The reference light source 11 generates a light which is a continuously oscillating and fixedly polarized light having a single wavelength (a single frequency). The light generated by this reference light source 11 is transmitted to the optical path branching coupler 12 via the transmission line OF1.

The optical path branching coupler 12 branches the light from the reference light source 11 into two lights while keeping its polarization state. One of the two lights after being branched by this optical path branching coupler 12 is transmitted, as the local oscillating light, to the optical heterodyne receiver 5 via the transmission line OF3, and the other light is transmitted, as a seed light for transmission, to the optical frequency and intensity modulator 13 via the transmission line OF2.

The optical frequency and intensity modulator 13 provides an offset frequency for the light from the optical path branching coupler 12, and performs pulse modulation in which on and off time intervals are repeated periodically. The structure of this optical frequency and intensity modulator 13 will be described below. The light on which frequency and intensity modulation is performed by this optical frequency and intensity modulator 13 is transmitted, as the transmission light, to the optical amplifier 2 via the transmission line OF4.

The optical amplifier 2 optically amplifies the transmission light from the optical frequency and intensity modulator 13 of the optical transmitter 1. At that time, the optical amplifier 2 performs the optical amplification by releasing the energy which is stored by using the accumulation action of the amplification medium during each pulse off time interval of the transmission light, within a pulse on time interval. The transmission light which is optically amplified by this optical amplifier 2 is transmitted to the optical circulator 3 via the transmission line OF5.

The optical circulator 3 switches between transmission lines which are output destinations, according to the light incident thereupon (the transmission light or the received light). When the transmission light is transmitted from the optical amplifier 2, the optical circulator 3 transmits the transmission light to the optical antenna unit 4 via the transmission line OF6. In contrast, when the received light is transmitted from the optical antenna unit 4, the optical circulator 3 transmits the received light to the optical heterodyne receiver 5 via the transmission line OF7.

The optical antenna unit 4 emits the transmission light transmitted by the optical circulator 3 into space (observation space), and receives, as received light, backscattered light from the space, the backscattered light being associated with the transmission light. When emitting the transmission light, the optical antenna unit 4 emits the transmission light into space while enlarging the transmission light to a specific beam diameter and also setting the direction of emitting the beam to a specific direction. Further, the transmission light emitted to the space by the optical antenna unit 4 is backscattered by a scattering object in the observation space (for example, an aerosol moving at the same speed as the wind speed), and receives a Doppler frequency shift corresponding to the moving speed of the scattering object. The backscattered light from the scattering object is then received by the optical antenna unit 4. The received light received by this optical antenna unit 4 is transmitted to the optical circulator 3 via the transmission line OF6.

The optical heterodyne receiver 5 performs optical heterodyne detection by using both the local oscillating light from the optical path branching coupler 12 of the optical transmitter 1, and the received light transmitted thereto, via the optical circulator 3, from the optical antenna unit 4. More specifically, the optical heterodyne receiver 5 outputs a beat signal having a frequency which is the difference between the frequency of the backscattered light and that of the local oscillating light by optically combining the local oscillating light and the received light (the backscattered light) and then performing photoelectric conversion. The beat signal outputted by this optical heterodyne receiver 5 is transmitted to the signal processor 6.

The signal processor 6 performs a frequency analysis on the beat signal from the optical heterodyne receiver 5. At that time, the signal processor 6 performs A/D conversion on the beat signal at a specific sampling rate, first. The signal processor then divides the beat signal on which the signal processor performs the A/D conversion into parts each having a reception gate (a time gate) corresponding to the pulse width of the transmission light. The signal processor then performs a fast Fourier transform on the beat signal after being divided on a per reception gate, thereby calculating the beak value, the spectral width, the SNR, etc. of a power spectrum acquired for each reception gate. Because each reception gate corresponds to a measured distance, a distribution of Doppler frequencies which respectively correspond to wind speeds in sight line directions for observation distances can be acquired through the above-mentioned arithmetic operation.

Further, the signal processor 6 has a function of outputting a command value for the line of sight of the observation to the optical antenna unit 4. Therefore, by storing the observation distance and the measured value of the wind speed which are acquired according to this command value, the observation distance and the measured value being associated with each sight line direction, a three-dimensional distribution of wind speeds can be estimated through a vector operation and distributions of wind directions and speeds for each observation distance can be acquired through a vector operation. The result of the analysis performed by this signal processor 6 is transmitted to the display 7.

The display 7 displays the result of the analysis performed by the signal processor 6.

Next, the structure of the optical frequency and intensity modulator 13 will be explained by referring to FIG. 2.

Figure 2:
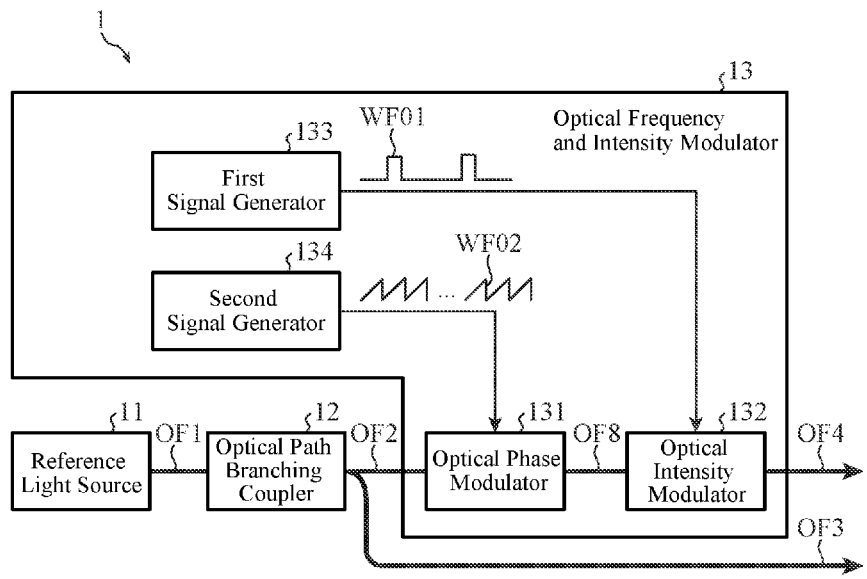
FIG. 2 is a block diagram showing the structure of an optical transmitter of the laser radar device in accordance with Embodiment 1 of the present invention.

The optical frequency and intensity modulator 13 is comprised of an optical phase modulator 131, an optical intensity modulator 132, a first signal generator 133 and a second signal generator 134, as shown in FIG. 2. The first signal generator 133 is connected to the optical intensity modulator 132, and the second signal generator 134 is connected to the optical phase modulator 131.

The optical phase modulator 131 performs phase modulation on the light from the optical path branching coupler 12 according to a saw tooth wave driving signal WF02 generated by the second signal generator 134, to provide an offset frequency for the light. The transmission light on which the phase modulation is performed by this optical phase modulator 131 is transmitted to the optical intensity modulator 132 via a transmission line OF8.

The optical intensity modulator 132 performs pulse modulation on the light from the optical phase modulator 131 according to a pulse modulation driving signal WF01 generated by the first signal generator 133, to output the light as the transmission light. The optical intensity modulator 132 can be any means as long as this means is the one of responding to a pulse width (several hundreds of [ns] to 1 [μs]) and a repetition frequency (several [kHz] to several tens of [kHz]) which are needed for the laser radar device. For example, an intensity modulator, such as a Mach Zehnder type LN modulator or an EA (Electro Absorption) modulator, can be considered as the optical intensity modulator. As an alternative, an optical amplifier, such as a semiconductor light amplifier or an optical fiber amplifier, an optical switch, such as an MEMS optical switch, or the like can be considered.

The first signal generator 133 generates the pulse modulation driving signal WF01 which is needed for the transmission light of the pulse-type laser radar device and in which on and off time intervals are repeated periodically, to drive the optical intensity modulator 132.

The second signal generator 134 generates the saw tooth wave driving signal WF02 having an amplitude 2 mVπ equal to an integral multiple (m times) of a driving voltage 2Vπ needed to acquire the modulation phase 2π (360 degrees) of the optical phase modulator 131, and a constant period T, to drive the optical phase modulator 131.

Next, the operation of the laser radar device for wind measurements which is constructed as above will be explained.

In the operation of the laser radar device, as shown in FIGS. 1 and 2, first, the reference light source 11 generates a light which is a continuously oscillating and fixedly polarized light having a single wavelength, and the optical path branching coupler 12 branches that light into two lights while keeping its polarization state. The optical path branching coupler transmits, as a local oscillating light, one of the two lights to the optical heterodyne receiver 5, and transmits, as a seed light for transmission, the other light to the optical frequency and intensity modulator 13.

The optical frequency and intensity modulator 13 then provides an offset frequency $f_{ofs}$ for the light from the optical path branching coupler 12, and performs pulse modulation, in which on and off time intervals are repeated periodically, on the light, to output this light as a transmission light. In a typical laser radar device, 195 [THz] is provided as the frequency ν of the light from the optical path branching coupler 12, a frequency ranging from several tens of [MHz] to several hundreds of [MHz] is provided as the offset frequency $f_{ofs}$, and a width ranging from several hundreds of ns to 1 μs is provided as the pulse width. The details of the operation of this optical frequency and intensity modulator 13 will be described below.

Then, the optical amplifier 2 optically amplifies the light from the optical frequency and intensity modulator 13, and the optical antenna unit 4 emits, as the transmission light, that light into space while enlarging the transmission light to a specific beam diameter and also setting the direction of emitting the beam to a specific direction.

The transmission light emitted by this optical antenna unit 4 is backscattered by a scattering object in the observation space, and receives a Doppler frequency shift corresponding to the moving speed of the scattering object. The optical antenna unit 4 then receives that backscattered light as a received light.

The optical heterodyne receiver 5 then performs optical heterodyne detection by using both the local oscillating light from the optical transmitter 1, and the received light transmitted thereto, via the optical circulator 3, from the optical antenna unit 4. More specifically, the optical heterodyne receiver 5 outputs a beat signal having a frequency which is the difference between the frequency of the backscattered light and that of the local oscillating light by optically combining the local oscillating light and the received light (the backscattered light) and then performing photoelectric conversion.

In this case, the frequency f of the beat signal acquired by the optical heterodyne receiver 5 is expressed by the following equation (1).

$$f = f_{ofs} + f_{DOP} \quad (1)$$

In this equation, $f_{ofs}$ denotes the offset frequency of the optical frequency and intensity modulator 13, and $f_{DOP}$ denotes a Doppler frequency according to a wind speed.

For example, when it is assumed that the offset frequency $f_{ofs}$ is 50 [MHz] and the Doppler frequency $f_{DOP}$ according to the wind speed is ±50 [MHz], this beat signal has a center frequency equal to or less than 100 [MHz]. This beat signal is continuously acquired immediately after the transmission light is emitted. Further, the distance L to the scattering object can be calculated, as shown in the following equation (2), from the arrival time Δt which has elapsed until the received light is received after the transmission light has been emitted.

$$L = \tfrac{1}{2} c \cdot \Delta t \tag{2}$$

In this equation, c denotes the speed of light.

The signal processor 6 then performs a frequency analysis on the beat signal from the optical heterodyne receiver 5. The result of the analysis performed by this signal processor 6 is stored in a data storage (not shown) within the laser radar device, and needed information is also displayed and provided for the user by the display 7.

Next, the operation of the optical frequency and intensity modulator 13 will be explained.

In the operation of the optical frequency and intensity modulator 13, first, the second signal generator 134 generates a saw tooth wave driving signal WF02 having an amplitude 2 mVπ equal to an integral multiple (m times) of the driving voltage 2Vπ needed to acquire the modulation phase 2π (360 degrees) of the optical phase modulator 131, and a constant period T. The optical phase modulator 131 then performs phase modulation on the transmission light from the optical path branching coupler 12 according to this saw tooth wave driving signal WF02, to provide the offset frequency for the transmission light.

As a result, a phase φ(t) having a constant rate of change 2 mπ/T [rad/s] with respect to a time t is outputted from the optical phase modulator 131, as shown in the following equation (3).

$$\phi(t) = \frac{2m\pi}{T} \mathrm{mod}(t, T) \tag{3}$$

In this equation, mod (t, T) denotes the remainder at the time of dividing the time t by the period T.

Further, the frequency f can be defined as a time differential of the phase phi, as shown in the following equation (4).

$$f = \frac{1}{2\pi} \frac{d}{dt} \phi(t) \tag{4}$$

Because the temporal change rate of the phase φ(t) is 2 mπ/T [rad/s], the offset frequency $f_{ofs}$ which is proportional to the reciprocal of the period T of the saw tooth wave driving signal WF02 can be acquired by the optical phase modulator 131, as shown in the following equation (5).

$$\begin{aligned} f_{ofs} &= \frac{1}{2\pi} \cdot \frac{2m\pi}{T} \\ &= m \frac{1}{T} \end{aligned} \tag{5}$$

Figure 3:
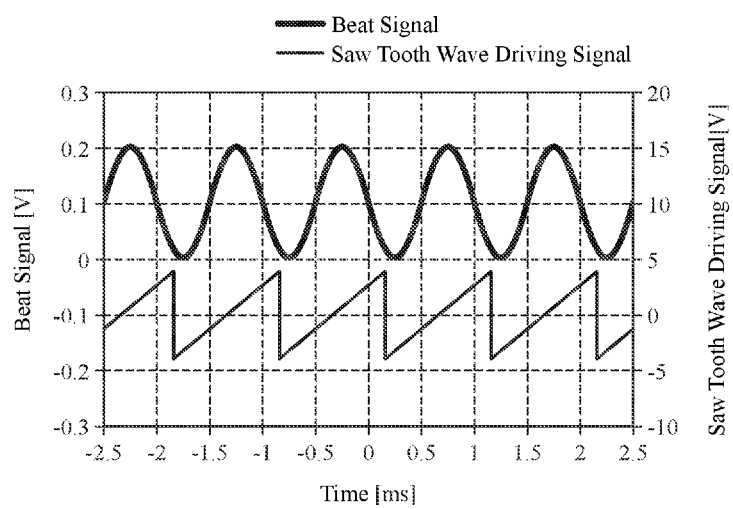
FIG. 3 is a diagram showing a saw tooth wave driving signal applied to an optical phase modulator in accordance with Embodiment 1 of the present invention, and a phase modulation characteristic feature (a beat signal)

In FIG. 3, an example of actual measurements of the saw tooth wave driving signal WF02 inputted to the optical phase modulator 131 in order to implement a frequency shift of 1 [kHz] and the beat signal acquired by the optical heterodyne receiver 5 from this saw tooth wave driving signal is shown. In FIG. 3, a thin line on a lower side shows the waveform of the saw tooth wave driving signal WF02, and a thick line on an upper side shows the waveform of the beat signal.

In the example shown in FIG. 3, the amplitude of the saw tooth wave driving signal WF02 is set to 7 [V] which is the 2Vπ (360 degrees) voltage of the optical phase modulator 131, and the period T is set to 1 [ms]. In this case, it is seen that a sinusoidal wave having a constant period of 1 [ms] is acquired as the beat signal, and a desired frequency shift of 1 [kHz] is acquired.

By driving the optical phase modulator 131 by using the saw tooth wave driving signal WF02 generated by the second signal generator 134 in this way, a desired offset frequency can be provided for the transmission light. For example, in the example shown in FIG. 3, in order to implement a frequency shift of 50 [MHz] by using the optical phase modulator 131, it is preferable to generate the saw tooth wave driving signal WF02 having an amplitude of 7 [V] and a period of 20 [ns].

The first signal generator 133 then generates a pulse modulation driving signal WF01 which is needed for the transmission light of the pulse-type laser radar device and in which on and off time intervals are repeated periodically. The optical intensity modulator 132 then performs pulse modulation on the light from the optical phase modulator 131 according to this pulse modulation driving signal WF01, to output the light as the transmission light.

Figure 4:
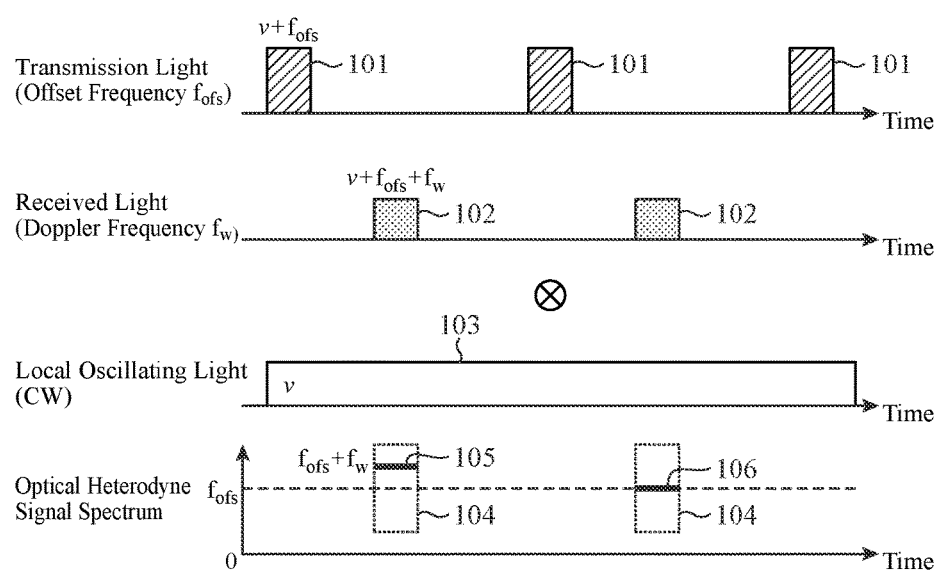
FIG. 4 is a diagram showing the timing diagram of each light in the laser radar device in accordance with Embodiment 1 of the present invention.

The timing diagram of each light in the laser radar device in accordance with Embodiment 1 is shown in FIG. 4.

As shown in FIG. 4, in the laser radar device in accordance with Embodiment 1, the transmission light 101 having a specific pulse width and a specific repetition period is first outputted by the optical phase modulator 131 and the optical intensity modulator 132. The frequency of this transmission light 101 is expressed by ν+$f_{ofs}$, where the output frequency of the reference light source 11 is expressed by ν and the offset frequency provided by the optical phase modulator 131 is expressed by $f_{ofs}$.

The received light 102 is a backscattered light from an aerosol moving in the atmospheric air while being transported by the wind, and is collected continuously during the pulse off time intervals of the transmission light 101. Although the received light 102 associated with a specific distance range is described for explanation in FIG. 4, the received light is actually collected continuously during the pulse off time intervals of the transmission light 101. The frequency of this received light 102 is expressed by ν+$f_{ofs}$+$f_w$ because the Doppler frequency $f_w$ according to the wind speed is added.

On the other hand, the local oscillating light 103 is outputted as a wave continuous with respect to time, and the frequency of the local oscillating light is equal to the frequency ν of the reference light source 11.

Then, after optically combining the received light 102 and the local oscillating light 103, the optical heterodyne receiver 5 performs photoelectric conversion and outputs the beat signal $f_{ofs}$+$f_w$ having a frequency which is the difference between the frequency of the received light 102 and that of the local oscillating light 103.

Therefore, time series data about the spectrum of the optical heterodyne signal (the beat signal) are acquired as a spectrum which is detuned, by the Doppler frequency $f_w$, from the center frequency $f_{ofs}$.

According to the above-mentioned structure, the provision of a desired offset frequency and the pulse modulation can be implemented without having to use an AO modulator which is needed in conventional laser radar devices.

The optical phase modulator 131 which is used in the present invention uses a refractive index change of the propagation light path which is caused by the electro-optical effect of an LN crystal. Therefore, there is no necessity to provide such a propagation length for the diffraction effect and the spatial separation of diffracted lights as is needed for AO modulators, and the unnecessity can contribute to downsizing and low power consumption. Further, the reduction in the propagation length makes it possible to position the optical phase modulator closer to the reference light source 11, thereby integrating the optical phase modulator and the reference light source.

Further, as the optical phase modulator 131 and the optical intensity modulator 132, modulators intended for optical communications and having a high-speed response (cut-off frequency ≥several tens of [GHz]), which are provided as commercially available products, can be acquired. Therefore, as compared with a conventional structure using an AO modulator and a modulation driving device which have not become widespread for optical communications, the use of the optical phase modulator and the optical intensity modulator can contribute to an improvement in the reliability and a cost reduction.

Further, in a case in which an AO modulator is used, an insertion loss changes and a line penalty occurs as a result of the angle of diffraction's changing dependently upon the frequency of the reference light source 11 (the center wavelength). On the other hand, because no element having wavelength dependency is disposed in the structure in accordance with the present invention, the allowable ranges for the wavelength variations and the wavelength setting range of the reference light source 11 can be expanded. As a result, the equipment for wavelength selection, experiments and stabilization which is used for the reference light source 11 becomes unnecessary, and this unnecessity can contribute to a cost reduction.

Further, by making a butt joint connection among the blocks within the optical transmitter 1, instead of making an optical fiber connection among them, the blocks can be integrated into one module.

Conventionally, in order to reduce a carrier leak light during the pulse off time intervals, an optical circulator and a total reflection mirror for causing a light to make a round trip in a light intensity modulation unit are needed. In contrast with this, because the above-mentioned optical circulator and the above-mentioned total reflection mirror become unnecessary in accordance with the present invention, the component count can be reduced and this reduction can contribute to a cost reduction.

In FIG. 4, as the spectrum of the optical heterodyne signal, the existence range of the Doppler frequency $f_w$ according to the wind speed in the specific distance range is denoted by a reference numeral 104, a peak frequency which is observed when the Doppler frequency $f_w$ is other than zero (the wind speed≠0) is denoted by a reference numeral 105, and a peak frequency which is observed when the Doppler frequency $f_w$ is zero (the wind speed=0) is denoted by a reference numeral 106.

As shown by the reference numeral 106, when the wind speed=0, the center frequency of the observation signal is equal to $f_{ofs}$ which is the center frequency. In the example of FIG. 4, a case is assumed in which the transmission light 101 is switched on and off ideally and there is no leak light during the pulse off time intervals. Therefore, no unnecessary beat signal accompanying a leak light exists in the optical heterodyne signal.

Therefore, it is preferable to extract only the existence range 104 of the Doppler frequency $f_w$ by using a filter and to perform signal processing in the signal processor 6. A structure in a case in which a leak light during the pulse off time intervals exists in the transmission light 101 will be explained in detail in Embodiment 2 and subsequent embodiments.

As mentioned above, because the laser radar device in accordance with this Embodiment 1 is constructed in such a way as to implement a means for implementing an addition of the offset frequency and the pulse modulation, which are needed as functions of the transmit side of the laser radar device, by using a combination of the optical phase modulator 131 and the optical intensity modulator 132, by performing the frequency shift and the pulsing which are needed for the transmit side, without using any AO modulator, the laser radar device can achieve downsizing and integration thereof, and an improvement in the reliability and a cost reduction according to a reduction in the component count.

Embodiment 2

Figure 5:
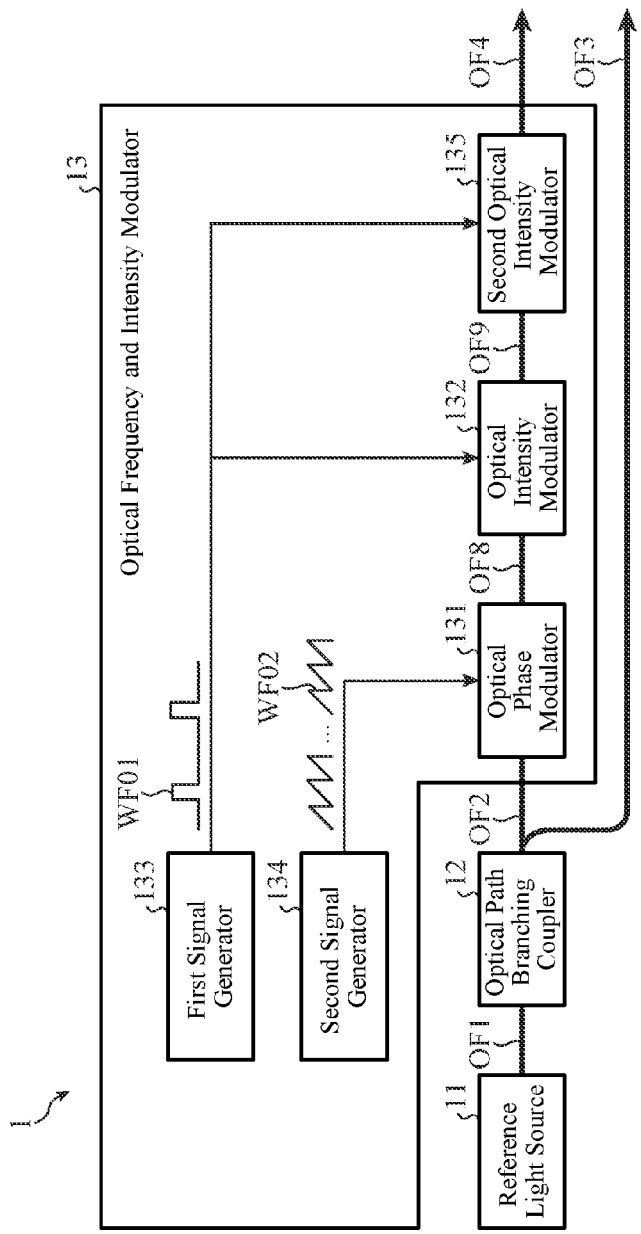
FIG. 5 is a block diagram showing the structure of an optical transmitter of a laser radar device in accordance with Embodiment 2 of the present invention.

In Embodiment 1, the case in which ideal pulse modulation is assumed as a transmission light characteristic is shown. In contrast with this, in Embodiment 2, a case in which a leak light exists during pulse off time intervals of a transmission light will be shown. FIG. 5 is a block diagram showing the structure of an optical transmitter 1 in accordance with Embodiment 2 of the present invention. The optical transmitter 1 in accordance with Embodiment 2 shown in FIG. 5 additionally includes a second optical intensity modulator 135 which is connected subordinately to an optical intensity modulator 132, in the optical frequency and intensity modulator 13 of the optical transmitter 1 in accordance with Embodiment 1 shown in FIG. 2. The other components are the same as those of Embodiment 1 and are designated by the same reference numerals, and only a different portion will be explained hereafter.

A first signal generator 133 generates a pulse modulation driving signal WF01 which is needed for a transmission light of a pulse-type laser radar device and in which on and off time intervals are repeated periodically, to drive the optical intensity modulator 132 and the second optical intensity modulator 135.

The second optical intensity modulator 135 performs pulse modulation on a transmission light from the optical intensity modulator 132 according to the pulse modulation driving signal WF01 generated by the first signal generator 133, and outputs the light as a transmission light. At that time, the second optical intensity modulator 135 performs modulation in synchronization with the optical intensity modulator 132, thereby suppressing a leak light during the pulse off time intervals of the transmission light. The second optical intensity modulator 135 can be any means as long as this means is the one of responding to a pulse width (several hundreds of [ns] to 1 [μs]) and a repetition frequency (several [kHz] to several tens of [kHz]) which are needed for the laser radar device. For example, an intensity modulator, such as a Mach Zehnder type LN modulator or an EA modulator, can be considered as the second optical intensity modulator. As an alternative, an optical amplifier, such as a semiconductor light amplifier or an optical fiber amplifier, an optical switch, such as an MEMS optical switch, or the like can be considered.

Figure 6:
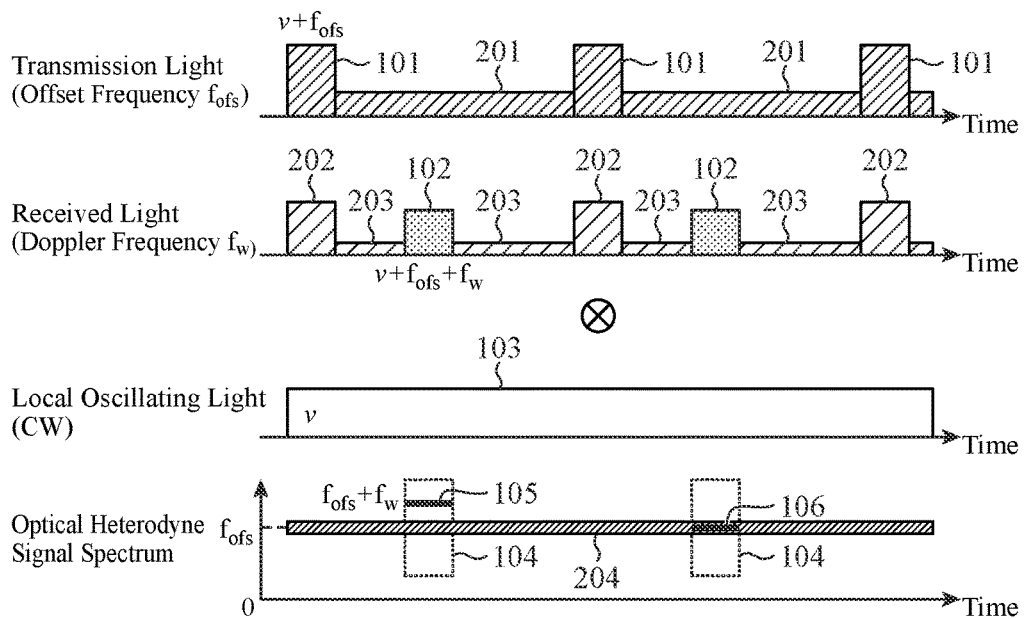
FIG. 6 is a diagram showing the timing diagram of each light in a case in which an optical intensity modulator has an insufficient on/off extinction ratio and no second optical intensity modulator is disposed, in the laser radar device in accordance with Embodiment 2 of the present invention.

The timing diaphragm of each light in a case in which an extinction characteristic during the pulse off time intervals, which is provided by the optical intensity modulator 23 in accordance with Embodiment 2, is not ideal is shown in FIG. 6.

As shown in FIG. 6, in the laser radar device in accordance with Embodiment 2, while the transmission light 101 having a specific pulse width and a specific repetition period is outputted during the pulse on time intervals, a leak light 201 is outputted during the pulse off time intervals.

After that, this leak light 201 is amplified by an optical amplifier 2. Then, because of a crosstalk from a transmission line OF5 to a transmission line OF7 of an optical circulator 3, and reflection by the internal parts of an optical antenna unit 4 placed as a stage following a transmission line OF6, the leak light is incident upon an optical heterodyne receiver 5 as a cross talk 202 to a received light path in the transmission light 101 (during the pulse on time intervals) and a leak light 203 to the received light path in the leak light 201 (during the pulse off time intervals).

Because this leak light 203 to the received light path results from leakage of the direct light of the transmission light 101 and reflection from fixed objects, the leak light has a frequency $v+f_{ofs}$ which is the same as that of the transmission light 101 (during the pulse on time intervals).

Therefore, the leak light 203 to the received light path and a local oscillating light 103 interfere with each other within the optical heterodyne receiver 5, so that an unnecessary beat signal 204 is generated. This unnecessary beat signal 204 has a frequency $f_{ofs}$ which is the difference between the frequency of the leak light 203 to the received light path, and that of the local oscillating light 103, and exists at all times.

On the other hand, in FIG. 6, as a spectrum of an optical heterodyne signal, the existence range of a Doppler frequency $f_w$ according to a wind speed in a specific distance range is denoted by a reference numeral 104, a peak frequency which is observed when the Doppler frequency $f_w$ is other than zero (the wind speed≠0) is denoted by a reference numeral 105, and a peak frequency which is observed when the Doppler frequency $f_w$ is zero (the wind speed=0) is denoted by a reference numeral 106.

In FIG. 6, the peak frequencies 105 and 106 of the Doppler frequency $f_w$ according to the wind speed coincide with the unnecessary beat signal 204 on the spectrum. Therefore, it becomes difficult to directly detect only the peak frequencies 105 and 106 of the Doppler frequency $f_w$ according to the wind speed.

Because the unnecessary beat signal 204 has a fixed value which is the center frequency $f_{ofs}$, by rejecting this fixed value through signal processing, the detection at the wind speed≠0 is enabled. However, measurements at the time of the wind speed=0 are still difficult.

To solve this problem, by performing synchronous modulation by using the second optical intensity modulator 135, together with the optical intensity modulator 132, the leak light 201 during the pulse off time intervals is suppressed.

Figure 7:
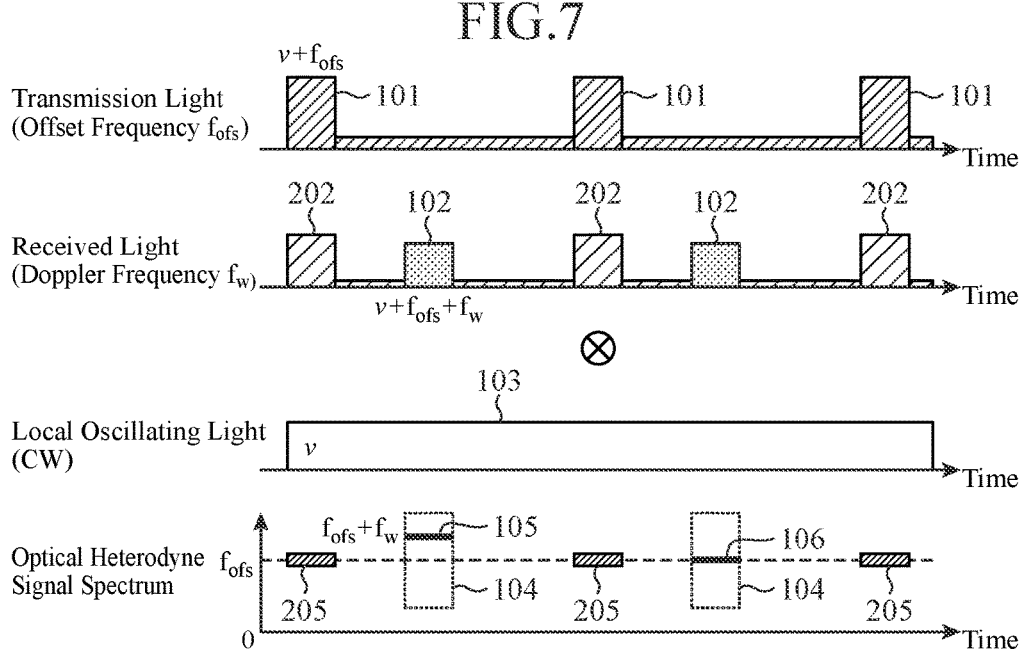
FIG. 7 is a diagram showing the timing diagram of each light in a case in which the optical intensity modulator has an insufficient on/off extinction ratio and a second optical intensity modulator is disposed, in the laser radar device in accordance with Embodiment 2 of the present invention.

The timing diaphragm of each light in the case in which the second optical intensity modulator 135 in accordance with Embodiment 2 is made to perform modulation in synchronization with the optical intensity modulator 132 is shown in FIG. 7.

As shown in FIG. 7, in the laser radar device in accordance with Embodiment 2, the leak light 201 of the transmission light 101 during the pulse off time intervals is suppressed by making the second optical intensity modulator 135 perform modulation in synchronization with the optical intensity modulator 132. As a result, as received lights, the cross talk 202 to the received light path in the transmission light 101 (during the pulse on time intervals) and a received light 102 caused by Doppler according to the wind speed are acquired.

Then, as a result of being combined with the local oscillating light 103 in the optical heterodyne receiver 5, only a beat signal 205 caused by the cross talk 202 of the transmission light 101 (during the pulse on time intervals) and the local oscillating light 103, and the Doppler frequency $f_w$ (the peak frequencies 105 and 106, the existence range 104) according to the wind speed appear on the spectrum of the optical heterodyne signal.

In this case, it is preferable to reject the beat signal 205 caused by the cross talk 202 of the transmission light 101 (during the pulse on time intervals) and the local oscillating light 103 with respect to time, in order for the laser radar device to deal with unnecessary signals at a distance of 0 m. As a result, because the unnecessary beat signal 205 can be suppressed from the spectrum of the optical heterodyne signal during the pulse off time intervals that the wind speed is desired to be observed, it becomes able to correctly detect Doppler according to the wind speed.

Although in Embodiment 2 the example in which the two stages which are the optical intensity modulators 132 and 135 are used is explained, this embodiment is not limited to this example, and two or more stages can be connected subordinately according to a needed suppression level.

In a case in which multiple conventional AO modulators are cascaded as stages, the center frequency increases with an increase in the number of stages. Therefore, it is conventionally necessary to make the components used in the optical heterodyne receiver 5 ready for high frequencies, and to increase the signal sampling rate in the signal processor 6. In contrast with this, because the center frequency does not change in the multi-stage cascade of the optical intensity modulators 132 and 135 in accordance with Embodiment 2, the next-stage signal processing can be used without having to change the signal processing.

Further, in each of the optical intensity modulators 132 and 135, an optical amplifier, such as a semiconductor light amplifier or an optical fiber amplifier, can be used as all or a part of the optical intensity modulator. In this case, it becomes able to compensate for an insertion loss (an optical path loss) during the pulse on time intervals which increases due to the multi-stage cascade of the optical phase modulator 131 and the optical intensity modulators 132 and 135 by using the gain provided by the optical amplification.

As mentioned above, because the laser radar device in accordance with this Embodiment 2 is constructed in such a way that the plurality of optical intensity modulators 132 and 135 are subordinately connected and perform synchronous modulation, a high pulse on/off extinction ratio which is needed as the performance of the transmit side of the laser radar device can be implemented in addition to the advantage provided by Embodiment 1. Further, because both the optical intensity modulator 132 and the second optical intensity modulator 135 do not have wavelength dependency, the allowable ranges for the wavelength variations and the wavelength setting range of a reference light source 11 can be expanded as compared with the case of a structure using a conventional AO modulator.

Embodiment 3

In Embodiments 1 and 2, the case in which the phase modulation is performed by using the continuous saw tooth wave driving signal WF02 is shown. In contrast with this, in Embodiment 3, a case in which phase modulation is performed by using a burst-like saw tooth wave driving signal WF03 which is synchronized with a transmission light will be shown. FIG. 8 is a block diagram showing the structure of an optical transmitter 1 in accordance with Embodiment 3 of the present invention. The optical transmitter 1 in accordance with Embodiment 3 shown in FIG. 8 additionally includes a signal multiplier (a third signal generator) 136, in the optical frequency and intensity modulator 13 of the optical transmitter 1 in accordance with Embodiment 1 shown in FIG. 2. The other components are the same as those of Embodiment 1 and are designated by the same reference numerals, and only a different portion will be explained hereafter.

The signal multiplier 136 outputs the burst-like saw tooth wave driving signal WF03 in which portions corresponding to the pulse on time intervals of a pulse modulation driving signal WF01 generated by a first signal generator 133 are extracted from a saw tooth wave driving signal WF02 generated by a second signal generator 134, to drive an optical phase modulator 131 on behalf of the second signal generator 134.

The optical phase modulator 131 performs phase modulation on a light from an optical path branching coupler 12 according to the burst-like saw tooth wave driving signal WF03 outputted by the signal multiplier 136, to provide an offset frequency for the light.

As a result, the offset frequency $f_{ofs}$ is added to a transmission light outputted from a transmission line OF04 during the pulse on time intervals while no offset frequency is added to the transmission light during the pulse off time intervals.

When a leak light exists during the pulse off time intervals of the optical intensity modulator 132, the offset frequency is added to the leak light in the structure in accordance with Embodiment 1. In contrast with this, in Embodiment 3, no offset frequency is added to the leak light.

The timing diagram of each light in the laser radar device in accordance with Embodiment 3 is shown in FIG. 9.

As shown in FIG. 9, in the laser radar device in accordance with Embodiment 3, while the transmission light 101 having a specific pulse width and a specific repetition period is outputted during the pulse on time intervals, a leak light 301 is outputted during the pulse off time intervals.

After that, this leak light 301 is amplified by an optical amplifier 2. Then, because of a cross talk from a transmission line OF5 to a transmission line OF7 of an optical circulator 3, and reflection by the internal parts of an optical antenna unit 4 placed as a stage following a transmission line OF6, the leak light is incident upon an optical heterodyne receiver 5 as a cross talk 302 to a received light path in the transmission light 101 (during the pulse on time intervals) and a leak light 303 to the received light path in the leak light 301 (during the pulse off time intervals).

While the frequency of the cross talk 302 during the pulse on time intervals is $v+f_{ofs}$, the frequency of the leak light 303 to the received light path in the leak light 301 (during the pulse off time intervals) is $v$ because no offset frequency is added during the pulse off time intervals.

Therefore, an unnecessary beat signal 304 which is generated, within the optical heterodyne receiver 5, from the cross talk 302 during the pulse on time intervals and a local oscillating light 103 appears at $f_{ofs}$ which is the center frequency only during the pulse on time intervals.

In contrast, an unnecessary beat signal 305 which is generated from the leak light 303 during the pulse off time intervals and the local oscillating light 103 appears in a baseband (at a frequency of 0).

Therefore, because during a time interval (each pulse off time interval) that a Doppler signal according to a wind speed is observed, the frequency $f_{ofs}+f_w$ of the Doppler signal (peak frequencies 105 and 106, an existence range 104) exists apart from the unnecessary beat signals 304 and 305 on the spectrum, it becomes able to electrically separate the Doppler signal and the unnecessary beat signals.

As mentioned above, because the laser radar device in accordance with this Embodiment 3 includes the signal multiplier 136 that outputs the burst-like saw tooth wave driving signal WF03 in which portions corresponding to the pulse on time intervals of the pulse modulation driving signal WF01 generated by the first signal generator 133 are extracted from the saw tooth wave driving signal WF02 generated by the second signal generator 134, to drive the optical phase modulator 131 on behalf of the second signal generator 134, the laser radar device can easily separate the Doppler signal according to the wind from the unnecessary beat signals 304 and 305 on the spectrum even when the pulse on and off performed by the optical intensity modulator 132 are imperfect. Therefore, in addition to the advantage provided by Embodiment 1, performance requirements on the on/off extinction ratio of the optical intensity modulator 132 can be relaxed and this relaxation can contribute to a cost reduction.

The combination of the bursty frequency shift and the pulse modulation in Embodiment 3 cannot be implemented in a conventional AO modulator without change because the output port of an outputted light to which a frequency shift is added and that of an outputted light to which no frequency shift is added differ from each other spatially. More specifically, a means for switching between a zero-order light output port (without any frequency shift) and a first-order light output port (with a frequency shift) of an AO modulator in synchronization with a pulse output is needed separately, and this necessity causes a technical problem, such as an increase in the insertion loss and occurrence of a synchronization displacement, and also induces enlargement and increased power consumption of the element and the demerits are serious. Further, such an increase in the insertion loss, which is caused by providing multiple stages of light intensity modulation units, as seen in the case of conventional examples, can be prevented and this prevention contributes to low power consumption.

Further, because both the optical intensity modulator 132 and the second optical intensity modulator 135 do not have wavelength dependency, like in the case of Embodiments 1 and 2, the allowable ranges for the wavelength variations and the wavelength setting range of a reference light source 11 can be expanded as compared with the case of a structure using a conventional AO modulator.

Embodiment 4

Figure 10:
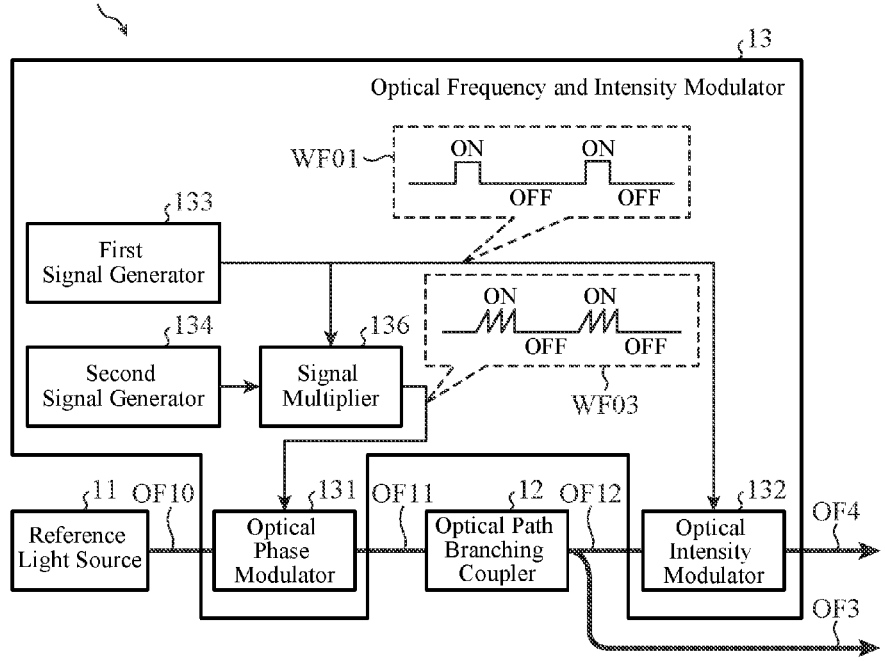
FIG. 10 is a block diagram showing the structure of an optical transmitter of a laser radar device in accordance with Embodiment 4 of the present invention.

In Embodiment 3, the case in which the phase modulation using the burst-like saw tooth wave driving signal WF03 which is synchronized with the transmission light is performed only on the transmission light is shown. In contrast with this, in Embodiment 4, a case in which such phase modulation is also performed on a local oscillating light will be shown. FIG. 10 is a block diagram showing the structure of an optical transmitter 1 in accordance with Embodiment 4 of the present invention. The optical transmitter 1 in accordance with Embodiment 4 shown in FIG. 10 is the one in which the position of an optical phase modulator 131 of an optical transmitter 1 in accordance with Embodiment 3 shown in FIG. 8 is changed to a position between a reference light source 11 and an optical path branching coupler 12. The other components are the same as those of Embodiment 1 and are designated by the same reference numerals, and only a different portion will be explained hereafter.

The optical phase modulator 131 performs phase modulation on a light from the reference light source 11 according to a burst-like saw tooth wave driving signal WF03 outputted by a signal multiplier 136, to provide an offset frequency for the light. The light on which the phase modulation is performed by this optical phase modulator 131 is transmitted to the optical path branching coupler 12 via a transmission line OF11.

The optical path branching coupler 12 branches the light from the optical phase modulator 131 into two lights while keeping its polarization state.

Further, an optical intensity modulator 132 performs pulse modulation on the light from the optical path branching coupler 12 according to a pulse modulation driving signal WF01 generated by a first signal generator 133, and outputs the light as a transmission light.

As a result, a change of the presence or absence of the offset frequency which corresponds to each pulse on or off time interval is added also to the local oscillating light.

Figure 11:
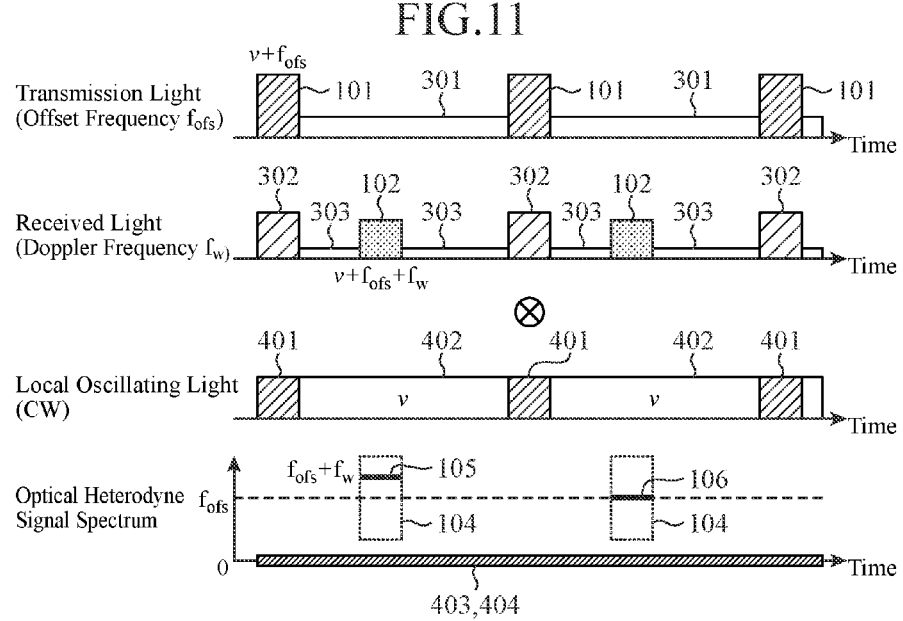
FIG. 11 is a diagram showing the timing diagram of each light in the laser radar device in accordance with Embodiment 4 of the present invention.

The timing diagram of each light in a laser radar device in accordance with Embodiment 4 is shown in FIG. 11.

As shown in FIG. 11, in the laser radar device in accordance with Embodiment 4, while the transmission light 101 having a specific pulse width and a specific repetition period is outputted during the pulse on time intervals, a leak light 301 is outputted during the pulse off time intervals.

After that, this leak light 301 is amplified by an optical amplifier 2. Then, because of a crosstalk from a transmission line OF5 to a transmission line OF7 of an optical circulator 3, and reflection by the internal parts of an optical antenna unit 4 placed as a stage following a transmission line OF6, the leak light is incident upon an optical heterodyne receiver 5 as a cross talk 302 to a received light path in the transmission light 101 (during the pulse on time intervals) and a leak light 303 to the received light path in the leak light 301 (during the pulse off time intervals).

While the frequency of the cross talk 302 during the pulse on time intervals is $v+f_{ofs}$, the frequency of the leak light 303 to the received light path in the leak light 301 (during the pulse off time intervals) is $v$ because no offset frequency is added during the pulse off time intervals.

In contrast, unlike in the case of Embodiment 3, the frequency of a local oscillating light 103 is $v+f_{ofs}$ during the pulse on time intervals (the pulse on time intervals 401), like that of the transmission light 101, and is $v$ during the pulse off time intervals (the pulse off time intervals 402).

Therefore, both an unnecessary beat signal 403 which is generated, within the optical heterodyne receiver 5, from the crosstalk 302 during the pulse on time intervals and the pulse on time intervals 401 of the local oscillating light 103 and an unnecessary beat signal 403 which is generated, within the optical heterodyne receiver 5, from the cross talk 303 during the pulse off time intervals and the pulse off time intervals 402 of the local oscillating light 103 appear in a baseband (at a frequency of 0).

On the other hand, a Doppler signal (peak frequencies 105 and 106, an existence range 104) according to a wind speed exists close to the center frequency. Therefore, because the Doppler signal exists apart from the unnecessary beat signals 304 and 305 on the spectrum, it becomes able to electrically separate the Doppler signal and the unnecessary beat signals.

As mentioned above, because the laser radar device in accordance with this Embodiment 4 is constructed in such a way as to perform the phase modulation using the burst-like saw tooth wave driving signal WF03 which is synchronized with the transmission light on the transmission light and the local oscillating light, the laser radar device can easily separate the Doppler signal according to the wind speed from the unnecessary beat signals 304 and 305 on the spectrum even when the pulse on and off performed by the optical intensity modulator 132 are imperfect. Therefore, in addition to the advantage provided by Embodiment 1, performance requirements on the on/off extinction ratio of the optical intensity modulator 132 can be relaxed and this relaxation can contribute to a cost reduction.

Further, by using the structure in accordance with Embodiment 4, as compared with the case of the structure in accordance with Embodiment 3, the unnecessary beat signal 403 during the pulse on time intervals can also be shifted to the baseband. Therefore, mixing of a leak light immediately after each pulse off time interval (a distance range of closest approach) when a temporal jitter error exists in the pulse timing can be avoided.

Therefore, erroneous detection in the estimation of the wind speed in the distance range of closest approach can be avoided and the measurement accuracy of the wind speed can be improved.

In addition, by using the structure in accordance with Embodiment 4, a structure can be provided in which a module in which a reference light source 11 and an optical phase modulator 131 which are widely applied in the uses of optical communications and which are formed integrally is used, and the general-purpose optical path branching coupler 12 and the optical intensity modulator 132 are connected as stages following the module. Therefore, there is provided an advantage of being able to utilize parts in which improvements in their reliability and cost reductions are advanced in the uses of optical communications.

Further, because both the optical intensity modulator 132 and the second optical intensity modulator 135 do not have wavelength dependency, like in the case of Embodiments 1 to 3, the allowable ranges for the wavelength variations and the wavelength setting range of the reference light source 11 can be expanded as compared with the case of a structure using a conventional AO modulator.

Embodiment 5

Figure 12:
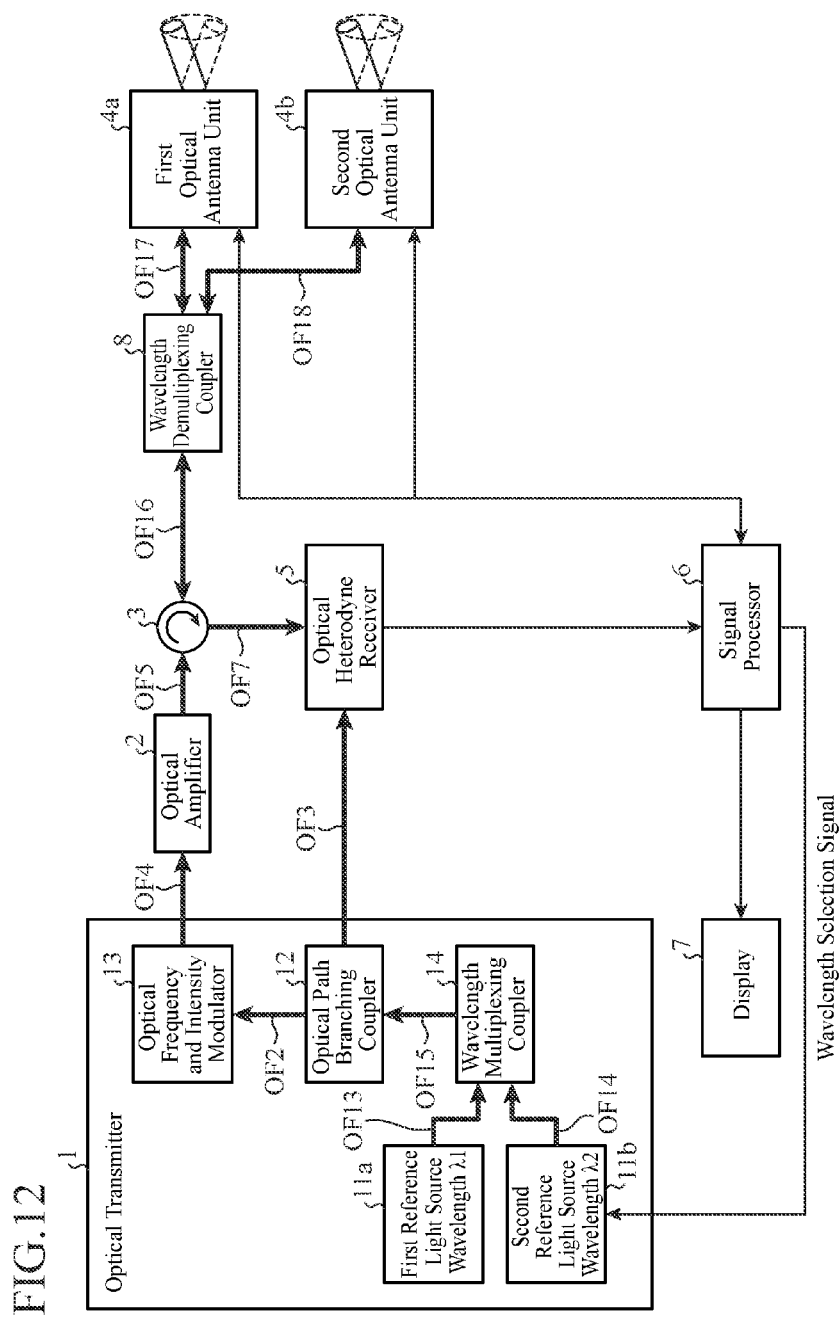
FIG. 12 is a block diagram showing the structure of a laser radar device in accordance with Embodiment 5 of the present invention.

In Embodiments 1 to 4, the case in which the single reference light source 11 and the single optical antenna unit 4 are used is shown. In contrast with this, in Embodiment 5, a case in which switching between observation spaces is performed using a plurality of reference light sources 11a and 11b having different wavelengths, and a plurality of optical antenna units 4a and 4b respectively corresponding to the wavelengths will be shown. FIG. 12 is a block diagram showing the structure of a laser radar device in accordance with Embodiment 5 of the present invention. The laser radar device in accordance with Embodiment 5 shown in FIG. 12, is the one in which the reference light source 11 and the optical antenna unit 4 of the laser radar device in accordance with Embodiment 1 shown in FIG. 1 are replaced by the first and second reference light sources 11a and 11b and the first and second optical antenna units 4a and 4b, and a wavelength demultiplexing coupler 8 and a wavelength multiplexing coupler 14 are added. The other components are the same as those of Embodiment 1 and are designated by the same reference numerals, and only a different portion will be explained hereafter.

The first reference light source 11a generates a light having a center wavelength (frequency) $\lambda 1$ which is a continuously oscillating and fixedly polarized light. The light generated by this first reference light source 11a is transmitted to the wavelength multiplexing coupler 14 via a transmission line OF13.

The second reference light source 11b generates a light having a center wavelength (frequency) $\lambda 2$ which is a continuously oscillating and fixedly polarized light. The light generated by this second reference light source 11b is transmitted to the wavelength multiplexing coupler 14 via a transmission line OF14.

The wavelength multiplexing coupler 14 performs wavelength multiplexing on the lights from the first and second reference light sources 11a and 11b. The light after being wavelength-multiplexed by this wavelength multiplexing coupler 14 is transmitted to an optical path branching coupler 12 via a transmission line OF15.

The optical path branching coupler 12 branches the light from the wavelength multiplexing coupler 14 into two lights while keeping its polarization state.

The wavelength demultiplexing coupler 8 demultiplexes a transmission light from an optical circulator 3 into transmission lights having different wavelengths. The transmission lights having different wavelengths after being demultiplexed by this wavelength demultiplexing coupler 8 are transmitted to corresponding first and second optical antenna units 4a and 4b via transmission lines OF17 and OF18.

The first optical antenna unit 4a corresponds to the first reference light source 11a, and emits the transmission light having the center wavelength $\lambda 1$ from the wavelength demultiplexing coupler 8 into space and receives, as a received light, a backscattered light from the space, the backscattered light being associated with that transmission light. The received light received by this first optical antenna unit 4a is transmitted to the optical circulator 3 via a transmission line OF16 and the transmission line OF17.

The second optical antenna unit 4b corresponds to the second reference light source 11b, and emits the transmission light having the center wavelength $\lambda 2$ from the wavelength demultiplexing coupler 8 into space and receives, as a received light, a backscattered light from the space, the backscattered light being associated with that transmission light. The received light received by this second optical antenna unit 4b is transmitted to the optical circulator 3 via the transmission lines OF16 and OF17.

In FIG. 12, the structure in which the optical path branching coupler 12 is positioned upstream from an optical frequency and intensity modulator 13, and no frequency shift is provided for a local oscillating light is shown as an example. However, this embodiment is not limited to this example, and the laser radar device can be constructed in such a way that the optical path branching coupler 12 is disposed, within the optical frequency and intensity modulator 13, as a stage following an optical phase modulator 131 which is driven by a saw tooth wave driving signal WF03, and a frequency shift is added also to the local oscillating light during the pulse on time intervals, like in the case of Embodiment 4. As a result, even if the on/off extinction ratio of an optical intensity modulator 132 disposed within the optical frequency and intensity modulator 13 is insufficient, an unnecessary beat signal 403 which is mixed into an optical heterodyne receiver 5, and a Doppler signal (peak frequencies 105 and 106, an existence range 104) according to a wind speed can be separated in a frequency domain.

In the structure shown in FIG. 12, the transmission light outputted, via the transmission line OF4, from an optical transmitter 1 is amplified by an optical amplifier 2 and is transmitted to the transmission line OF16 via the optical circulator 3, like in the case of the structure of FIG. 1 in Embodiment 1.

The transmission light is then transmitted to the wavelength demultiplexing coupler 8 from the transmission line OF6, and its optical path is switched for each of the wavelengths of the first and second reference light sources 11a and 11b. The light corresponding to the wavelength $\lambda 1$ from the first reference light source 11a is transmitted to the first optical antenna unit 4a, while the light corresponding to the wavelength $\lambda 2$ from the second reference light source 11b is transmitted to the second optical antenna unit 4b.

By disposing the first optical antenna unit 4a and the second optical antenna unit 4b toward different observation spaces, it becomes able to switch between the observation spaces by performing switching between the wavelengths, to perform measurements.

Further, a signal processor 6 transmits a time sequence signal for wavelength selection indicating which reference light source has been selected, at each time, from among the first reference light source 11a and the second reference light source 11b to the optical transmitter 1.

Simultaneously, the above-mentioned time sequence signal for wavelength selection is recorded and stored in the signal processor 6, together with time series data about Doppler signals measured. This data is used, in an analysis of a Doppler signal, when identifying which one of the first and second optical antenna units 4a and 4b has been selected.

As mentioned above, because the laser radar device in accordance with this Embodiment 5 is constructed in such a way as to use the plurality of reference light sources 11a and 11b having different wavelengths and the plurality of optical antenna units 4a and 4b corresponding to the wavelengths, to switch between the observation spaces, the plurality of optical antenna units 4a and 4b can be installed and fixed toward the different observation spaces in advance, and switching between the observation spaces can be performed by electrically switching between the wavelengths. As a result, switching between the observation spaces can be performed at a high speed.

Further, by fixing the optical antenna units 4a and 4b at different geographical positions with the zenith direction being defined as the visual field center, and then switching between the optical antenna units 4a and 4b by performing switching between the wavelengths, vertical distributions of wind directions and speeds at two points can be measured by the single laser radar device.

Further, in a structure using a conventional AO modulator, an optical frequency and intensity modulator 13 needs to be disposed for each wavelength in order to construct a structure of switching between the optical antenna units 4a and 4b for each wavelength because the conventional modulator has wavelength dependency. In contrast with this, in Embodiment 5, the single optical frequency and intensity modulator 13 can be shared. Therefore, the component count can be reduced and this reduction can contribute to a cost reduction.

In addition, as a variable wavelength laser array which is put in practical use in recent optical communication equipment, a module in which 12 or more arrays of a reference light source and a wavelength multiplexing coupler are formed integrally has been marketed. Therefore, by using this variable wavelength laser array for optical communications, not only downsizing of the element can be implemented, but also utilization of the component which is subjected to a reliability test as a component for communications and which provides an advantage of reducing the cost because of economies of scale in manufacturing can be implemented. Therefore, the cost including development costs can be reduced.

Figure 13:
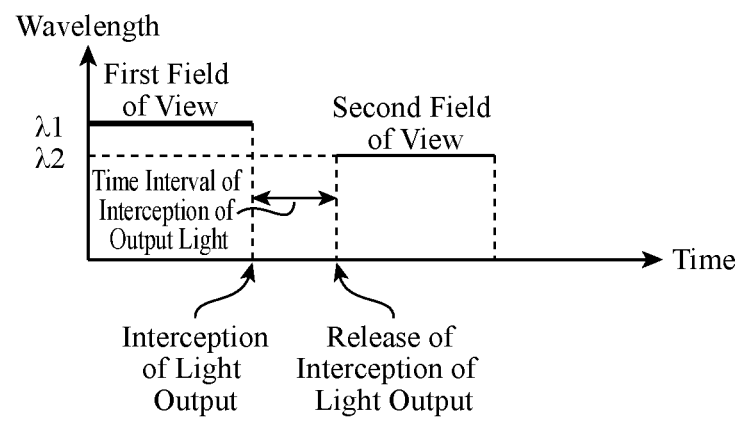
FIG. 13 is a time chart showing a case in which there exists a light interruption time interval at the time of switching between wavelengths in the laser radar device in accordance with Embodiment 5 of the present invention.

On the other hand, in the above-mentioned variable wavelength laser array, the wavelength of a light at the time of outputting the light is not stabilized, and it takes much time for the wavelength to become stable. Therefore, there is a case in which there exists a light interruption time interval at the time of switching between wavelengths, as shown in FIG. 13, in order to prevent the variable wavelength laser array from outputting a light having an unstable wavelength. In FIG. 13, a case of, in a state of outputting the light from the reference light source 11a corresponding to the wavelength $\lambda 1$ and measuring a first field of view, switching to the light from the reference light source 11b corresponding to the wavelength $\lambda 2$ according to a command from the signal processor 6, and measuring a second field of view is shown.

In a state in which the wavelength is unstable, the frequency of a signal which is heterodyne-received as a measurement result of the laser radar device changes according to a wavelength variation, and this change causes a measurement error. However, when there exists a light interruption time interval, the optical amplifier 2 disposed within the laser radar device is excited without light during the light interruption time interval, and this results in a cause of failure.

Therefore, in Embodiment 5, in order to solve the problem arising in the above-mentioned wavelength switching, control can be performed as follows. More specifically, before switching between the wavelengths, the optical transmitter 1 switches on both the reference light sources 11a and 11b which are targets for switching first, and waits a time interval during which the wavelength of the reference light source 11b (11a) corresponding to the wavelength after switching enters a stable state. After this wavelength then enters a stable state, the optical transmitter switches off the reference light source 11a (11b) corresponding to the wavelength before switching.

Figure 14:
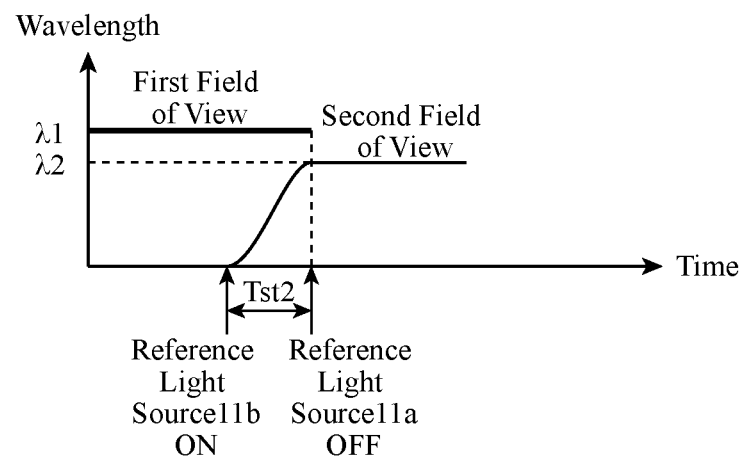
FIG. 14 is a time chart showing a case in which control is carried out in such a way as to eliminate any light interruption time interval at the time of switching between wavelengths in the laser radar device in accordance with Embodiment 5 of the present invention.

For example, it is assumed that, as shown in FIG. 14, when a light is outputted from the reference light source 11a corresponding to the wavelength $\lambda 1$ and the first field of view is measured, a selected wavelength switching signal (a time sequence signal for wavelength selection) indicating switching from the wavelength $\lambda 1$ to the wavelength $\lambda 2$ is inputted from the signal processor 6 to the optical transmitter 1. In this case, the optical transmitter switches on the reference light source 11b corresponding to the wavelength $\lambda 2$ first while making the reference light source 11a corresponding to the wavelength $\lambda 1$ remain on. Then, after waiting a time interval Tst2, whose value has been acquired in advance, during which the wavelength of the reference light source 11b corresponding to the wavelength $\lambda 2$ becomes stable, the optical transmitter switches off the reference light source 11a corresponding to the wavelength $\lambda 1$. Also when performing wavelength switching from the wavelength $\lambda 2$ to the wavelength $\lambda 1$, the optical transmitter performs the same control. By using the above-mentioned control method, the optical transmitter can prevent the optical amplifier 2 from being excited without light and improve the failure tolerance.

Although the case in which the number of wavelengths used is two is shown above, the present embodiment is not limited to this example and N wavelengths can be alternatively used.

Embodiment 6

Figure 15:
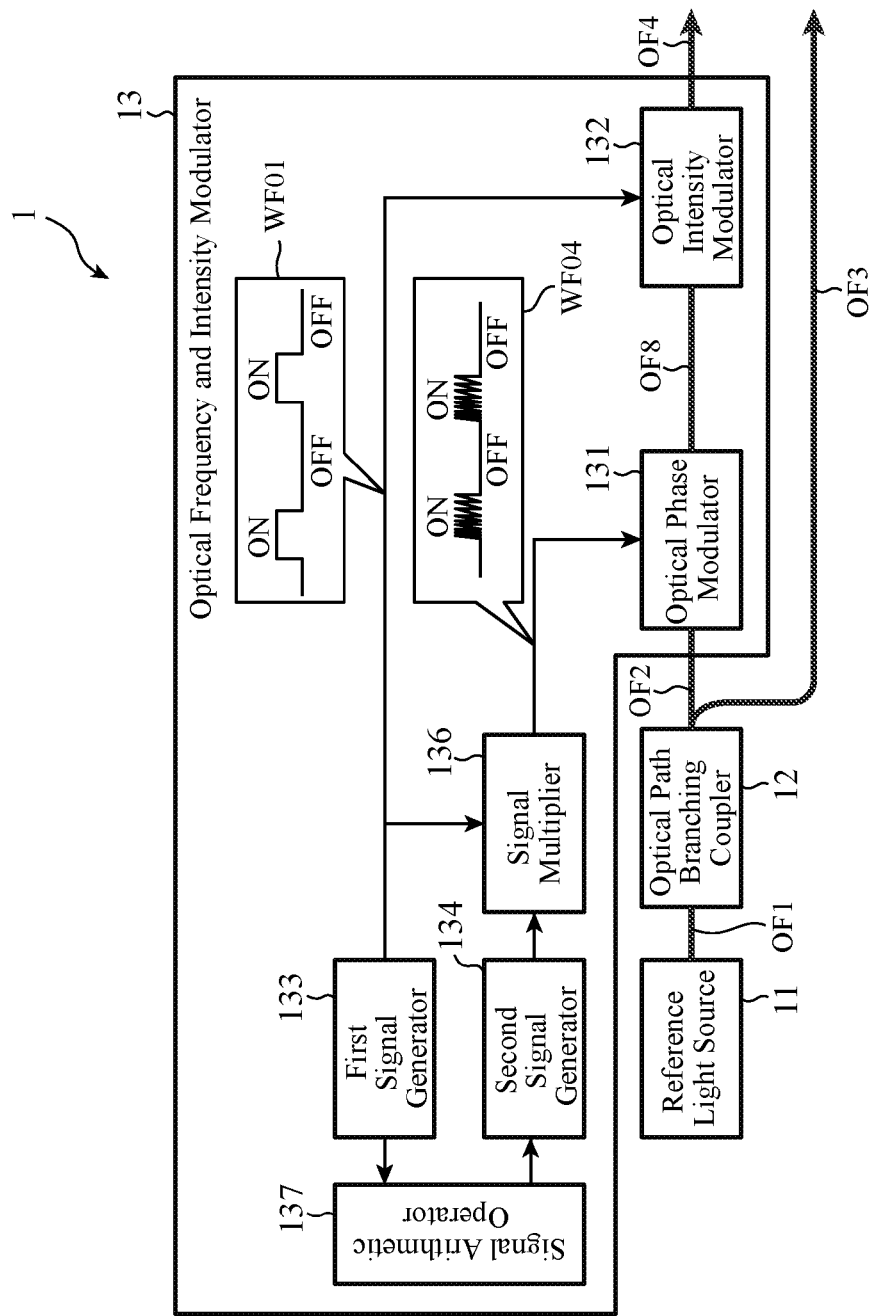
FIG. 15 is a block diagram showing the structure of an optical transmitter of a laser radar device in accordance with Embodiment 6 of the present invention.

In Embodiment 6, a case in which a function of making the period of a saw tooth wave variable is added to the structure, shown in Embodiments 3 and 4, of performing phase modulation by using a burst-like saw tooth wave driving signal WF03 which is synchronized with a pulse modulation driving signal WF01 will be shown. FIG. 15 is a block diagram showing the structure of an optical transmitter 1 of a laser radar device in accordance with Embodiment 6 of the present invention. The optical transmitter 1 in accordance with Embodiment 6 shown in FIG. 15 additionally includes a signal arithmetic operator 137, in the optical transmitter 1 in accordance with Embodiment 3 shown in FIG. 8. The other components are the same as those of Embodiment 1 and are designated by the same reference numerals, and only a different portion will be explained hereafter.

The signal arithmetic operator 137 estimates a frequency deviation during each pulse on time interval from a pulse modulation driving signal WF01 generated by a first signal generator 133, and controls driving of a second signal generator 134 in such a way as to compensate for an influence of that frequency deviation upon a transmission light.

The second signal generator 134 then generates a saw tooth wave driving signal according to the control by the signal arithmetic operator 137, and a signal multiplier 136 extracts portions corresponding to the pulse on sections of the pulse modulation driving signal WF01. As a result, a burst-like saw tooth wave driving signal WF04 is outputted to an optical phase modulator 131.

Next, the estimation of the frequency deviation will be explained.

When a pulsed light is incident upon an optical medium, its refractive index varies dependently upon the light intensity according to the nonlinear optical effect. The propagation in the medium after the pulsed light is incident satisfies a propagation equation shown by the following equation (6), on the assumption that the electric field of the light varies slowly (a slowly varying approximation) with respect to the propagating direction.

$$i\frac{\partial A}{\partial z} = -\frac{i}{2}\alpha A + \frac{1}{2}\beta_2 \frac{\partial^2}{\partial T^2}A - \frac{2\pi}{\lambda}\gamma |A|^2 A \qquad (6)$$

In this equation, A denotes the electric field of the light, alpha denotes an attenuation in the transmission line, $\lambda$ denotes the wavelength, and $\beta_2$ denotes an increase factor in the pulse width according to refractive index dispersion.

The third term in the right-hand side of the equation (6) shows the nonlinear optical effect according to a nonlinear optical coefficient gamma given by the following equation (7).

$$\gamma = \frac{n_2 \omega_0}{cA_{\mathit{eff}}} = \frac{2\pi}{\lambda}\frac{n_2}{A_{\mathit{eff}}} \qquad (7)$$

In this equation, c denotes the speed of light, $A_{eff}$ denotes the effective area of the transmission line, $\omega_0$ denotes the frequency of the light, and $n_2$ denotes the nonlinear index of refraction associated with the third-order nonlinear polarization.

It is then assumed that self-phase modulation which is dominant even in the nonlinear optical effect in an optical intensity modulator 132 used in the present invention is performed, and the dispersion is zero ($\beta_2=0$). Further, the electric field A of the light is expressed by a normalized amplitude U given by the following equation (8).

$$A(z, t) = \sqrt{P_0} \exp\left[-\frac{\alpha z}{2}\right] \cdot U(z, t) \quad (8)$$

Further, a solution of the normalized amplitude U is expressed by the following equation (9).

$$U(z,t)=U(0,t)\exp[i\phi_{NL}(z,t)] \quad (9)$$

In this equation, U(0, t) denotes the normalized amplitude at the propagation distance z=0, and $\phi_{NL}$ denotes a nonlinear phase deviation.

Further, the nonlinear phase deviation $\phi_{NL}$ is expressed by the following equation (10).

$$\phi_{NL}(z, t) = |U(0, t)|^2 \frac{L_{eff}}{L_{NL}} \quad (10)$$

In this equation, $L_{eff}$ denotes an effective propagation distance, and $L_{NL}$ denotes a nonlinear length.

Further, the effective propagation distance $L_{eff}$ and the nonlinear length $L_{NL}$ are expressed by the following equations (11) and (12), respectively.

$$L_{eff} = \frac{1 - \exp[-\alpha L]}{\alpha} \quad (11)$$

$$L_{NL} = \frac{1}{\gamma \cdot P_0} \quad (12)$$

On the other hand, a temporal change of the nonlinear phase deviation $\phi_{NL}$ is expressed, as the frequency deviation $f_{chirp}(t)$ of the pulsed light, as shown in the following equation (13).

$$f_{chirp}(t) = -\frac{1}{2\pi} \frac{\partial \phi_{NL}(z, t)}{\partial t} = -\frac{1}{2\pi}\left(\frac{L_{eff}}{L_{NL}}\right)\frac{\partial}{\partial t}|U(0, t)|^2 \quad (13)$$

According to the above equation, the frequency deviation $f_{chirp}(t)$ can be calculated as an amount proportional to the temporal change rate of the intensity of the pulsed light.

Further, the sign of the above-mentioned frequency deviation is negative in a typical transmission line, an optical fiber amplifier or the like. On the other hand, in an element, such as a semiconductor light amplifier or a semiconductor optical switch, in which its refractive index given by the equation (7) varies due to the amount of carrier injection, the sign of the equation (13) can be set to be positive.

More specifically, when making a semiconductor light amplifier operate in the gain saturation region, the sign is negative, whereas when making a semiconductor light amplifier operate in the nonsaturation region, the sign can be set to be positive.

By using the above characteristics as forecast information, a time interval during which the frequency of the transmission light deviates, and its deviation quantity can be estimated as the frequency deviation $f_{chirp}(t)$.

In this case, as a method of eliminating the influence of the frequency deviation upon the transmission light, there can be considered the following two methods: a method (a first frequency deviation compensation method) of setting an offset frequency during a time interval that the frequency deviation exists to zero, and a method (a second frequency deviation compensation method) of subtracting the frequency deviation $f_{chirp}(t)$ from the offset frequency $f_{ofs}$.

Figure 16:
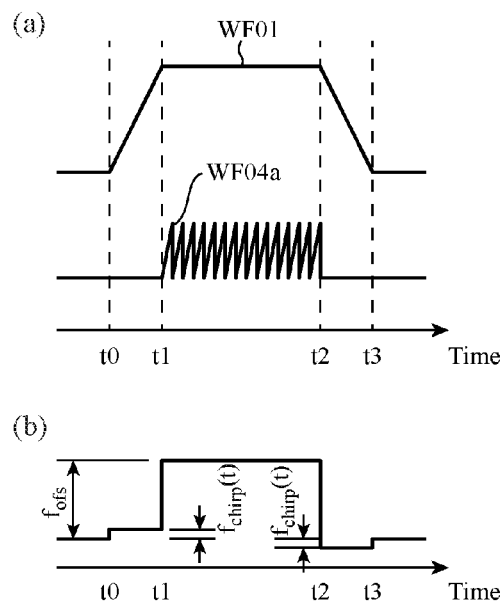
FIG. 16 is a diagram explaining a first frequency deviation compensation method for use in the laser radar device in accordance with Embodiment 6 of the present invention.

First, the method (the first frequency deviation compensation method) of setting the offset frequency during a time period that the frequency deviation exists to zero will be explained by referring to FIG. 16. FIG. 16 is a diagram showing a modulation waveform for compensating for the influence of the frequency deviation in the laser radar device in accordance with Embodiment 6.

It is assumed that the pulse modulation driving signal WF01 has a trapezoidal shape which rises with a positive slope during a time interval of t0≤t<t1, has a constant value during a time interval of t1≤t<t2, and falls with a negative slope during a time interval of t2≤t<t3, as shown in FIG. 16(a).

The time intervals during which a frequency deviation occurs in the pulse modulation driving signal WF01 shown in FIG. 16(a) are t0≤t<t1 and t2≤t<t3 during which the temporal change rate of the intensity of the pulse modulation driving signal WF01 is non-zero. Therefore, the signal arithmetic operator 137 does not drive the second signal generator 134 during the time intervals that the temporal change rate of the above-mentioned intensity is non-zero, but drives the second signal generator 134 only during t1≤t<t2 that the temporal change rate of the above-mentioned intensity is zero, in such a way as to cause the second signal generator 134 to generate a saw tooth wave driving signal. The signal multiplier 136 then extracts the portions corresponding to the pulse on sections of the pulse modulation driving signal WF01 from the saw tooth wave driving signal acquired by this second signal generator 134, thereby acquiring a saw tooth wave driving signal WF04a in a burst state, and then outputs this saw tooth wave driving signal to the optical phase modulator 131.

As a result, as the effective offset frequency, $+f_{chirp}$ is acquired during the time interval of t0≤t<t1, $f_{ofs}$ is acquired during the time interval of t1≤t<t2, and $-f_{chirp}$ chirp is acquired during the time interval of t2≤t<t3, as shown in FIG. 16(b). As a result, only the frequency during t1≤t<t2 that no frequency deviation occurs appears as an intermediate frequency, and an influence during the time interval that a frequency deviation occurs appears on the baseband.

Figure 17:
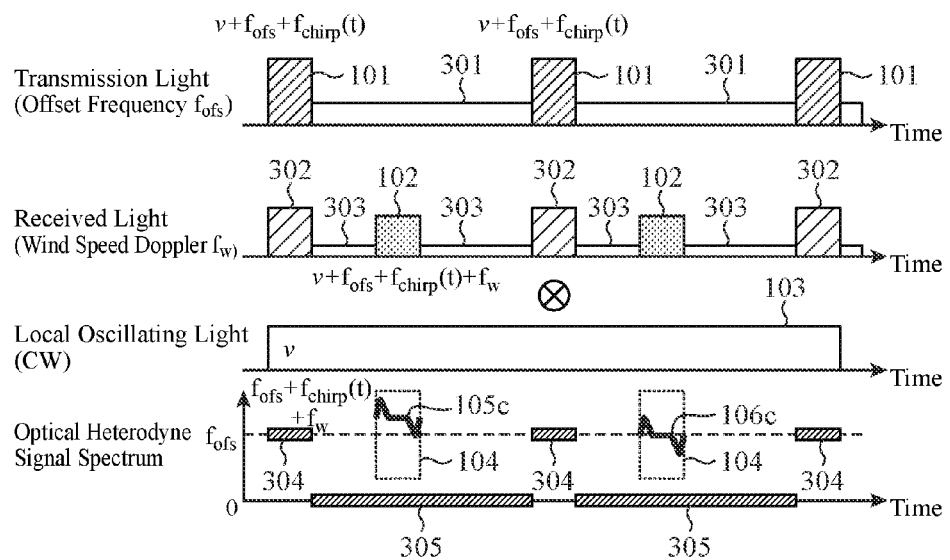
FIG. 17 is a diagram showing the timing diagram of each light in the laser radar device in accordance with Embodiment 6 of the present invention (in a case in which no frequency deviation compensation is performed)

The timing diagram of each light in the laser radar device in accordance with Embodiment 6 is shown in FIG. 17 (in a case in which no frequency deviation compensation is performed).

Because the transmission light receives a frequency deviation during the pulse on time intervals of the transmission light 101 when no frequency deviation compensation is performed in the laser radar device in accordance with Embodiment 6, the frequency of the transmission light 101 can be expressed by $\nu+f_{ofs}+f_{chirp}(t)$, as shown in FIG. 17. Therefore, in the target range of an optical heterodyne signal, the influence of the frequency deviation is piggybacked onto a Doppler signal according to a wind speed, as denoted by reference symbols 105*c* and 106*c*.

The frequency deviation within this target range appears as an influence which is similar to that in a case in which a wind speed variance occurs, and therefore discrimination between them is difficult and the measurement accuracy degrades.

Figure 18:
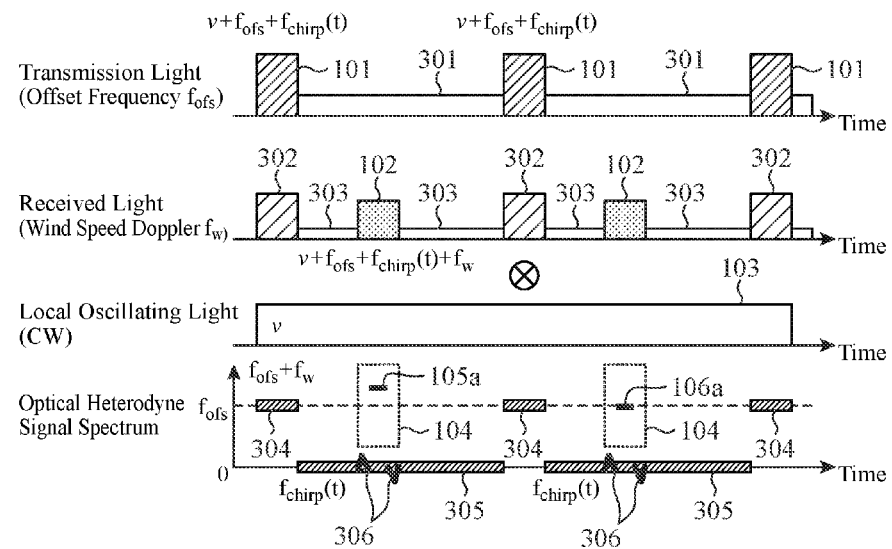
FIG. 18 is a diagram showing the timing diagram of each light in the laser radar device in accordance with Embodiment 6 of the present invention (when the first frequency deviation compensation method is applied)

Next, the timing diagram of each light in the laser radar device in accordance with this embodiment is shown in FIG. 18 (when the first frequency deviation compensation method is applied).

In the first frequency deviation compensation method in accordance with Embodiment 6, the saw tooth wave driving signal WF04*a* is outputted only during the time interval that no frequency deviation occurs, within each pulse on time interval of the transmission light 101. Therefore, in the target range of the optical heterodyne signal, only the Doppler signal according to the wind speed during the time interval that no influence of the frequency deviation is included can be acquired, as denoted by reference symbols 105*a* and 106*a*.

As a result, the influence of the frequency deviation which occurs when no frequency deviation compensation is performed, the influence being piggybacked onto the Doppler signal, and which cannot be discriminated from a wind speed variance can be removed to outside an existence range 104 of a Doppler frequency $f_w$ according to a wind speed. In this case, the influence of the frequency deviation appears, on the baseband, as an unnecessary beat signal 306 which results from a combination of a leak light 303 and a local oscillating light 103 during the pulse off time intervals of the transmission light 101.

Figure 19:
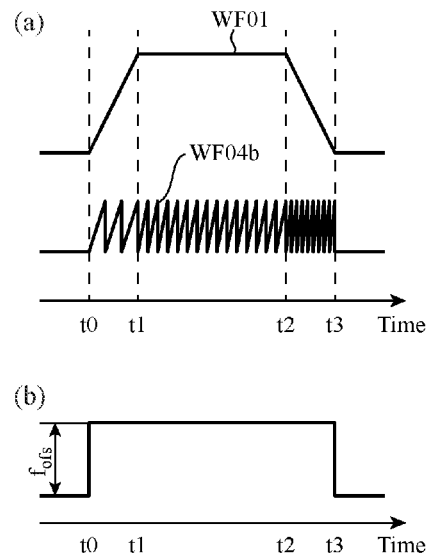
FIG. 19 is a diagram explaining a second frequency deviation compensation method for use in the laser radar device in accordance with Embodiment 6 of the present invention.

Next, the method (the second frequency deviation compensation method) of subtracting the frequency deviation $f_{chirp}(t)$ from the offset frequency $f_{ofs}$ will be explained by referring to FIG. 19. FIG. 19 is a diagram showing a modulation waveform for compensating for the influence of the frequency deviation in the laser radar device in accordance with Embodiment 6.

It is assumed that the pulse modulation driving signal WF01 has a trapezoidal shape which rises with a positive slope during a time interval of t0≤t<t1, has a constant value during a time interval of t1≤t<t2, and falls with a negative slope during a time interval of t2≤t<t3, as shown in FIG. 19.

The influence of the frequency deviation $f_{chirp}(t)$ upon the transmission light can be estimated as an amount proportional to the temporal change rate of the intensity of the pulse modulation driving signal WF01 expressed by the equation (13). Therefore, by subtracting the above-mentioned frequency deviation $f_{chirp}(t)$ from the offset frequency $f_{fofs}$, the frequency deviation during each pulse on time interval of the transmission light can be compensated for.

Therefore, the signal arithmetic operator 137 controls the driving of the second signal generator 134 in such a way as to generate a saw tooth wave driving signal having a period which is the result of subtracting the frequency (the frequency deviation $f_{chirp}(t)$) proportional to the temporal change rate of the intensity of the pulse modulation driving signal WF01 from the offset frequency $f_{fofs}$ which is provided for the transmission light. More specifically, the period T'(t) of the saw tooth wave driving signal is made to vary with time, as shown in the following equation (14). The signal multiplier 136 then extracts the portions corresponding to the pulse on sections of the pulse modulation driving signal WF01 from the saw tooth wave driving signal acquired by this second signal generator 134, thereby acquiring a saw tooth wave driving signal WF04*b* in a burst state, and then outputs this saw tooth wave driving signal to the optical phase modulator 131.

$$T'(t) = m \frac{1}{f_{ops} - f_{chirp}(t)} \quad (14)$$

Figure 20:
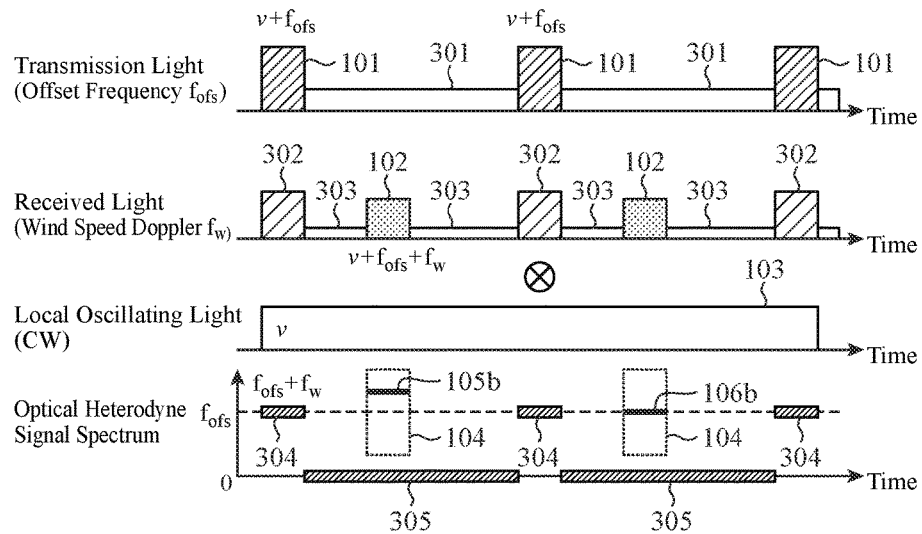
FIG. 20 is a diagram showing the timing diagram of each light in the laser radar device in accordance with Embodiment 6 of the present invention (when the second frequency deviation compensation method is applied)

Next, the timing diagram of each light in the laser radar device in accordance with Embodiment 6 is shown in FIG. 20 (when the second frequency deviation compensation is applied).

In the second frequency deviation compensation method in accordance with Embodiment 6, a saw tooth wave driving signal is generated at the period T'(t) calculated according to the equation (14) by using the estimated frequency deviation $f_{chirp}(t)$ during the pulse on time intervals of the transmission light 101, so that the saw tooth wave driving signal WF04*b* is acquired. Therefore, in the target range of the optical heterodyne signal, only the Doppler signal according to the wind speed in which no influence of the frequency deviation is included can be acquired, as denoted by reference symbols 105*b* and 106*b*.

As a result, the influence of the frequency deviation which occurs when no frequency deviation compensation is performed, the influence being piggybacked onto the Doppler signal, and which cannot be discriminated from a wind speed variance can be corrected. In this case, the influence of the frequency deviation is compensated for and does not appear even in the unnecessary beat signal 305 on the baseband, unlike in the case of using the first frequency deviation compensation method.

Next, the operation of estimating the frequency deviation $f_{chirp}(t)$ which is performed by the signal arithmetic operator 137 will be explained by referring to FIG. 21.

Figure 21:
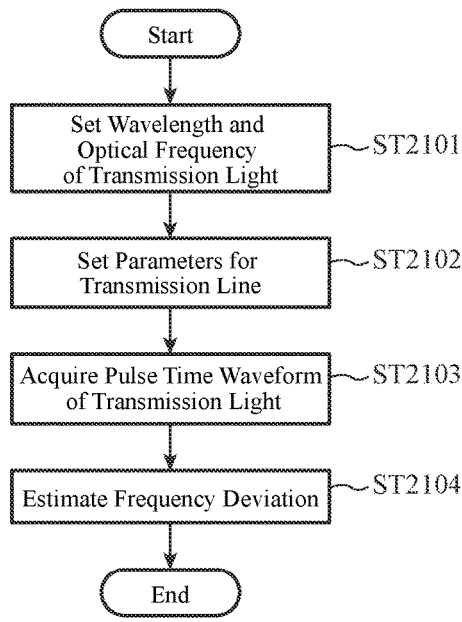
FIG. 21 is a flow chart showing an estimation of a frequency deviation by a signal arithmetic operator of the laser radar device in accordance with Embodiment 6 of the present invention.

In the operation of estimating the frequency deviation $f_{chirp}(t)$ which is performed by the signal arithmetic operator 137, first, the wavelength A of the target transmission light is set and the frequency $\omega_0$ of the light is calculated from $\omega_0 = c/\lambda$ (step ST2101), as shown in FIG. 21.

Then, the effective area $A_{eff}$, the transmission line length L, and the nonlinear index of refraction $n_2$ which are the parameters of the transmission line to be used are set (step ST2102).

Then, the peak power P0 of the transmission light and the pulse time waveform $|U(0, t)|^2$ of normalized intensity are acquired from the pulse modulation driving signal WF01 generated by the first signal generator 133 (step ST2103). When reproducibility is ensured for each pulse repetition, time series data measured in advance can be stored as the time waveform of normalized intensity and can be read.

Then, by using the equation (13), the frequency deviation $f_{chirp}(t)$ is estimated (step ST2104).

Figure 22:
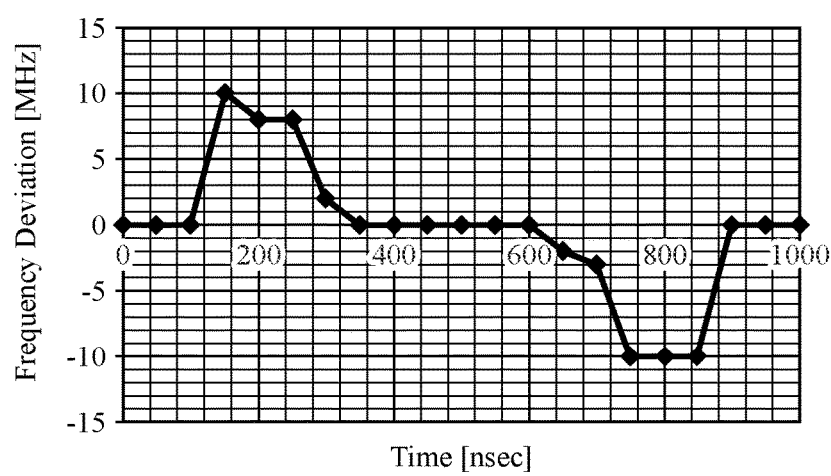
FIG. 22 is a diagram showing the time waveform of the frequency deviation in the laser radar device in accordance with Embodiment 6 of the present invention.

Measured values of the time waveform of the frequency deviation $f_{chirp}$ in the case of using a semiconductor light amplifier as the optical intensity modulator 132 and using this amplifier in the nonsaturation region are shown in FIG. 22.

As shown in FIG. 22, it is seen that a frequency deviation of 10 [MHz] having a positive sign appears during each rise time interval of the transmission light, and a frequency deviation of 10 [MHz] having a negative sign appears during each fall time interval of the transmission light.

Further, in a case in which a semiconductor light amplifier is used in the saturation region, the sign of the frequency deviation $f_{chirp}$ chirp with respect to the temporal change of the transmission light is reversed.

Therefore, it is also possible to control the excited state of the semiconductor light amplifier between the saturation region and the nonsaturation region while monitoring the amount of frequency deviation, to minimize the frequency deviation.

In addition, as shown in FIG. 1, an optical amplifier 2 for power amplification is usually connected as a stage following an optical frequency and intensity modulator 13 in the laser radar device. As this optical amplifier 2, a tapered semiconductor light amplifier, a rare earth doped optical fiber amplifier, a waveguide type optical amplifier in which a laser medium is formed into a waveguide shape, or the like is used.

Also in these amplifiers, when the power density is high, a frequency deviation accompanying the Karr effect occurs in the transmission line. The sign of this frequency deviation is negative with respect to the temporal change rate of the transmission light. Therefore, it is possible to minimize the frequency deviation occurring in the previous-stage optical frequency and intensity modulator 13 by making either an optimum setting on the excited state of the semiconductor light amplifier or an optimum setting on the saw tooth wave driving signal.

As a result, it is possible to make a correction including compensation for the influence of the frequency deviation upon the optical amplifier 2 which is conventionally hard to make.

As mentioned above, because the laser radar device in accordance with this Embodiment 6 includes the signal arithmetic operator 137 that estimates a frequency deviation during each pulse on time interval from the pulse modulation driving signal WF01 generated by the first signal generator 133, and that controls the driving of the second signal generator 134 in such a way as to compensate for the influence of that frequency deviation upon the transmission light, there is provided an advantage of being able to suppress the influence of the frequency deviation $f_{chirp}$ during each pulse on time interval, which is induced by the self-phase modulation effect of the signal light, both in the case in which a semiconductor light amplifier or the like is used as the optical intensity modulator 132, and in the next-stage optical amplifier 2, the transmission line, etc., in addition to the advantages provided by Embodiment 3.

Further, by performing control by using the signal arithmetic operator 137 in such a way as not to drive the second signal generator 134 during a time interval that the temporal change rate of the intensity of the pulse modulation driving signal WF01 is non-zero, an unnecessary frequency component according to the frequency deviation f chirp during the pulse on time intervals, which is induced by the self-phase modulation effect of the signal light, can be moved to outside the existence range of the Doppler frequency according to the wind speed and can be prevented from being piggybacked onto the Doppler signal according to the wind speed, and therefore the measurement accuracy can be improved.

Further, by controlling the second signal generator 134 by using the signal arithmetic operator 137 in such a way as to generate a saw tooth wave driving signal having a period which is the result of subtracting the frequency deviation $f_{chirp}$ (t from the offset frequency $f_{fofs}$ which is provided for the transmission light, an unnecessary frequency component according to the frequency deviation $f_{chirp}$ during the pulse on time intervals, which is induced by the self-phase modulation effect of the signal light, can be compensated for and can be prevented from being piggybacked onto the Doppler signal according to the wind speed, and therefore the measurement accuracy can be improved.

The structure of adding the signal arithmetic operator 137 to the optical transmitter 1 in accordance with Embodiment 3 shown in FIG. 8 is shown in FIG. 15. In contrast with this, the signal arithmetic operator 137 can be added to the optical transmitter 1 in accordance with Embodiment 4 shown in FIG. 10. In this case, the same advantages can be provided.

Embodiment 7

In Embodiment 5 shown in FIG. 12, when there arises a problem of instability in the wavelengths of the reference light sources 11a and 11b at a time of wavelength switching, the problem can be solved by controlling an erroneous wavelength shift caused by the wavelength instability by using the saw tooth wave driving signal of the optical frequency and intensity modulator 13.

Figure 23:
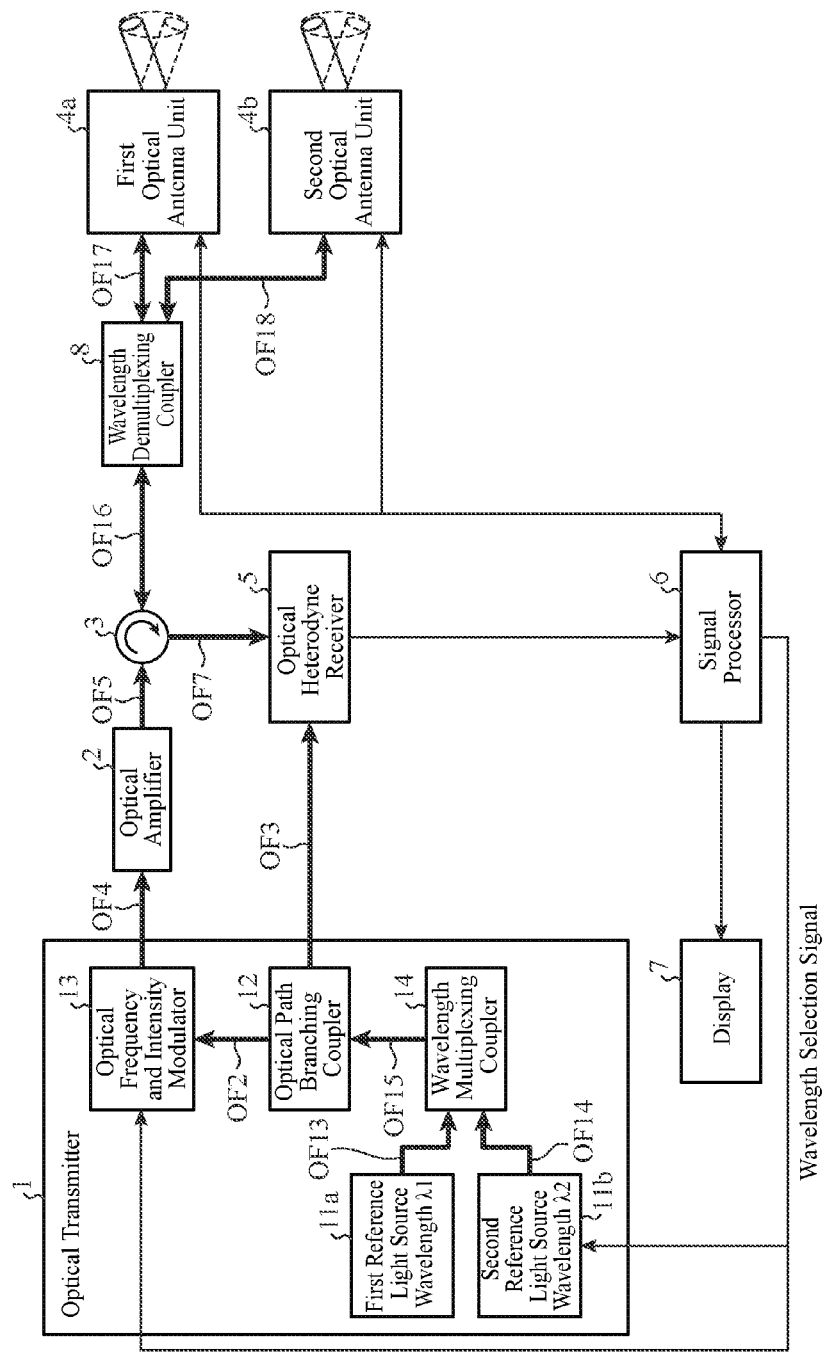
FIG. 23 is a block diagram showing the structure of a laser radar device in accordance with Embodiment 7 of the present invention.

FIG. 23 is a block diagram showing the structure of a laser radar device in accordance with Embodiment 7 of the present invention. The laser radar device in accordance with Embodiment 7 shown in FIG. 23 is the one in which a signal processor 6 and an optical frequency and intensity modulator 13 are connected to each other via a connecting line, in the laser radar device in accordance with Embodiment 5 shown in FIG. 12. The other components are the same as those of Embodiment 5 and are designated by the same reference numerals, and only a different portion will be explained hereafter.

The signal processor 6 outputs a time sequence signal for wavelength selection not only to reference light sources 11a and 11b of an optical transmitter 1 but also to the optical frequency and intensity modulator 13, in addition to the function in accordance with Embodiment 5 shown in FIG. 12.

At a time of wavelength switching, the optical transmitter 1 switches off the reference light source 11a (11b) corresponding to a wavelength before switching and switches on the reference light source 11b (11a) corresponding to a wavelength after switching according to the time sequence signal for wavelength selection from the signal processor 6.

Further, at a time of wavelength switching, a second signal generator 134 of an optical frequency and intensity modulator 13 generates a saw tooth wave driving signal having a period corresponding to a frequency temporal variation caused by an unstable state of the wavelength in the reference light source 11b (11a) corresponding to the wavelength after switching according to the time sequence signal for wavelength selection from the signal processor 6.

Figure 24:
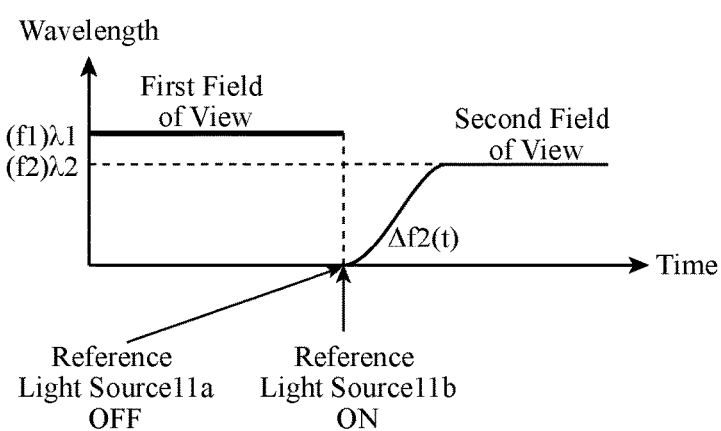
FIG. 24 is a time chart showing a case in which control is carried out in such a way as to eliminate any light interruption time interval at the time of switching between wavelengths in the laser radar device in accordance with Embodiment 7 of the present invention.

In this case, the optical transmitter 1 switches off the reference light source 11a corresponding to the wavelength λ1 and simultaneously switches on the reference light source 11b corresponding to the wavelength λ2 at a time of wavelength switching, as shown in, for example, FIG. 24.

On the other hand, the optical frequency and intensity modulator 13 acquires the frequency temporal variation Δf2(t) from the stable wavelength which is caused by the wavelength instability in the reference light source 11b of the wavelength λ2 in advance. The second signal generator 134 then changes the period T of the saw tooth wave driving signal by using the frequency temporal variation Δf2(t)=m/T(t) from the above-mentioned stable wavelength at a time of wavelength switching. As a result, it becomes able to compensate for the frequency shift caused by the wavelength instability.

Embodiment 8

Figure 25:
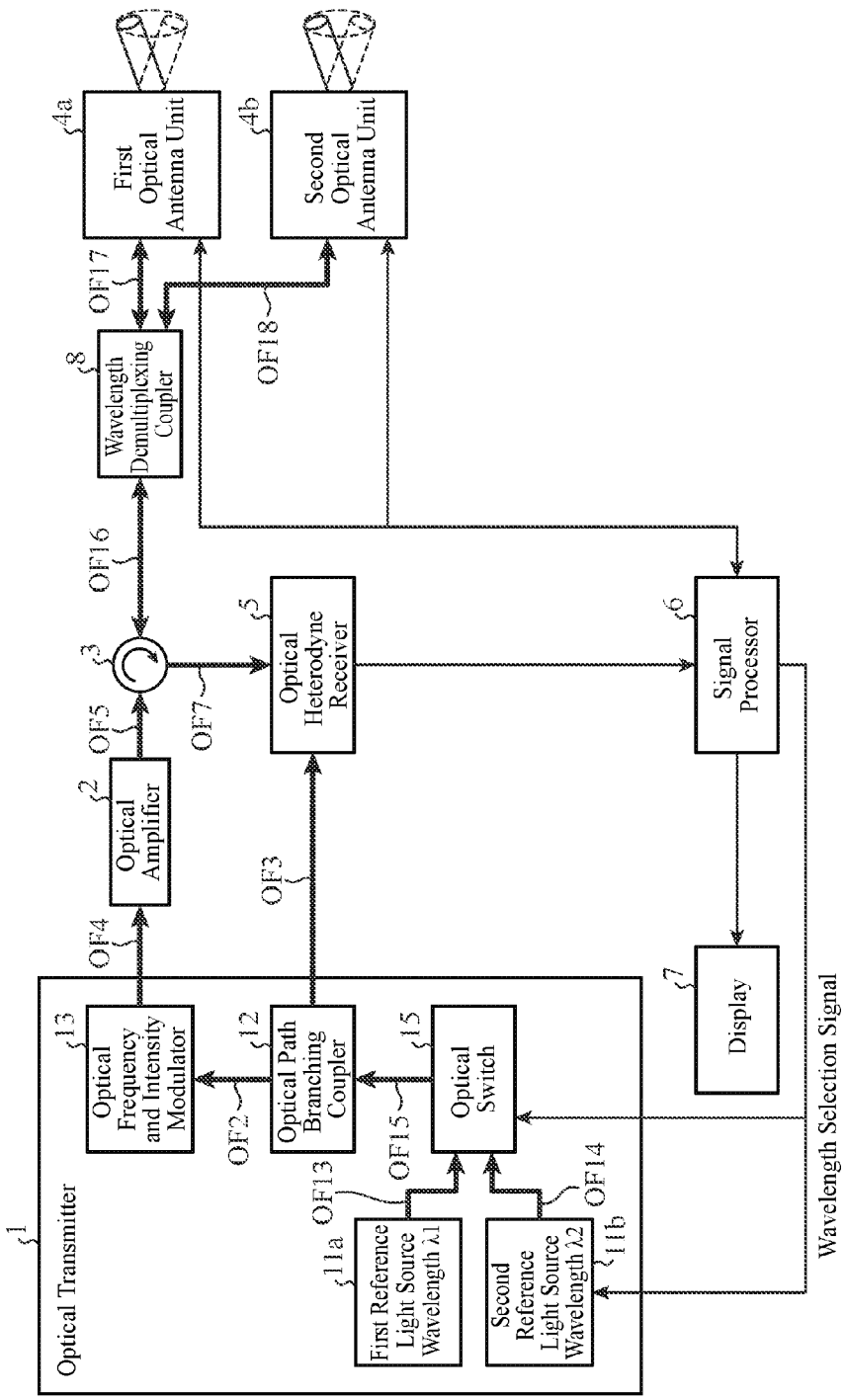
FIG. 25 is a block diagram showing the structure of a laser radar device in accordance with Embodiment 8 of the present invention.

In Embodiment 5 shown in FIG. 12, when there arises a problem of instability in the wavelengths of the reference light sources 11a and 11b at a time of wavelength switching, the problem can be solved by also providing a structure shown in FIG. 25.

FIG. 25 is a block diagram showing the structure of a laser radar device in accordance with Embodiment 8 of the present invention. The laser radar device in accordance with Embodiment 8 shown in FIG. 25 is the one in which the wavelength multiplexing coupler 14 of the laser radar device in accordance with Embodiment 5 shown in FIG. 12 is replaced by an optical switch 15, and a signal processor 6 and the optical switch 15 is connected to each other via a connecting line. The other components are the same as those of Embodiment 5 and are designated by the same reference numerals, and only a different portion will be explained hereafter.

The signal processor 6 outputs a time sequence signal for wavelength selection not only to reference light sources 11a and 11b of an optical transmitter 1 but also to the optical switch 15, in addition to the function in accordance with Embodiment 5 shown in FIG. 12.

The optical switch 15 selectively outputs a continuously oscillating light generated by each of the reference light sources 11a and 11b. This optical switch 15 outputs a continuously oscillating light having a corresponding wavelength according to the time sequence signal for wavelength selection from the signal processor 6.

Figure 26:
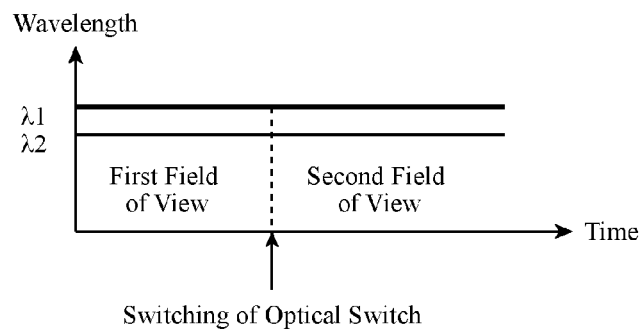
FIG. 26 is a time chart showing a case in which control is carried out in such a way as to eliminate any light interruption time interval at the time of switching between wavelengths in the laser radar device in accordance with Embodiment 8 of the present invention.

In this case, as shown in FIG. 26, both the reference light sources 11a and 11b are normally in a state of outputting a light. In this state, the optical switch 15 switches between on and off of each of its input ports according to the time sequence signal for wavelength selection from the signal processor 6. As a result, the optical switch can output only the corresponding wavelength.

As the optical switch 15, not only a mechanical optical switch using MEMS or the like, but also any type of optical switch, such as an optical waveguide type switch, can be used. For example, in a case in which a waveguide type optical switch using the electro-optical effect of LiNbO3 is used, fast switching of sub-picosecond order can be carried out, and there is provided an advantage of being able to solve the problem that an optical amplifier 2 is excited without light due to interruptions of light. In addition, because the optical switch can be further integrated and downsized as compared with the wavelength multiplexing coupler 14, the use of the optical switch contributes to downsizing. Further, in a case in which an optical switch that provides an electro-optical effect using a semiconducting material is used, a semiconductor laser array having a plurality of wavelengths and a semiconductor light amplifier for power amplification can be integrated into a single unit, and this integration contributes to further downsizing.

Embodiment 9

Figure 27:
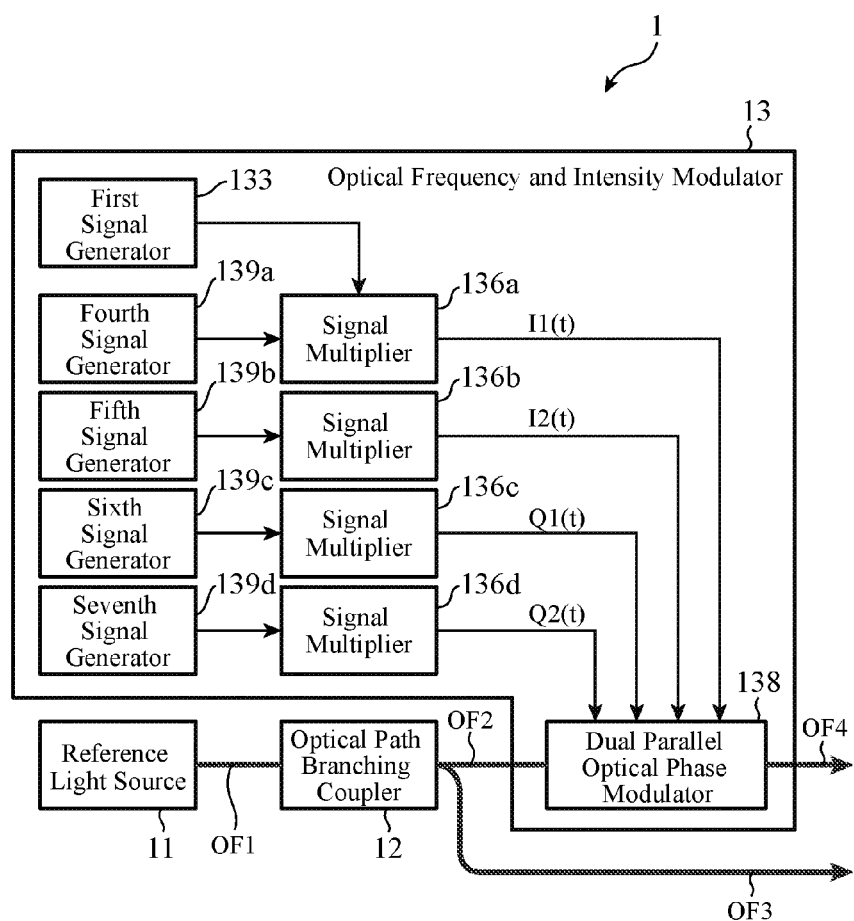
FIG. 27 is a block diagram showing the structure of an optical transmitter of a laser radar device in accordance with Embodiment 9 of the present invention.

FIG. 27 is a block diagram showing the structure of an optical transmitter 1 in accordance with Embodiment 9 of the present invention. The optical transmitter 1 in accordance with Embodiment 9 shown in FIG. 27 is the one in which the optical intensity modulator 132 of the optical transmitter 1 in accordance with Embodiment 3 shown in FIG. 8 is removed, the optical phase modulator 131 is replaced by a dual parallel optical phase modulator (an optical phase amplitude modulator) 138, the second signal generator 134 is replaced by fourth to seventh signal generators 139a to 139d, and a plurality of signal multipliers 136 are disposed while being brought into correspondence with the fourth to seventh signal generators 139a to 139d. The other components are the same as those of Embodiment 1 and are designated by the same reference numerals, and only a different portion will be explained hereafter.

A first signal generator 133 generates a pulse modulation driving signal WF01 which is needed for a transmission light of the pulse-type laser radar device and in which on and off time intervals are repeated periodically.

The fourth to seventh signal generators 139a to 139d generate sine wave driving signals each having an amplitude $V\pi$ equal to a driving voltage $V\pi$ needed to acquire a modulation phase of n (180 degrees) of the dual parallel optical phase modulator 138, and having a constant period T, in such a way that the sine wave driving signals hold a relation of a 90-degree phase difference among them. At that time, the fourth and fifth signal generators 139a and 139b generate the sine wave driving signals having a phase difference of 180 degrees between them. Further, the sixth and seventh signal generators 139c and 139d generate the sine wave driving signals having a phase difference of 180 degrees between them.

The signal multipliers 136a to 136d output burst-like sine wave driving signals (driving signals) in each of which portions corresponding to the pulse on time intervals of a pulse modulation driving signal WF01 generated by the first signal generator 133 are extracted from the sine wave driving signal generated by the corresponding one of the fourth to seventh signal generators 139a to 138d, to drive the dual parallel optical phase modulator 138.

The dual parallel optical phase modulator 138 performs phase modulation on a light from an optical path branching coupler 12 by using the burst-like sine wave driving signals $I1(t)$, $I2(t)$, $Q1(t)$ and $Q2(t)$ on which multiplication is performed by the signal multipliers 136a to 136d, to provide an offset frequency for the light, and outputs the light as a transmission light.

Figure 28:
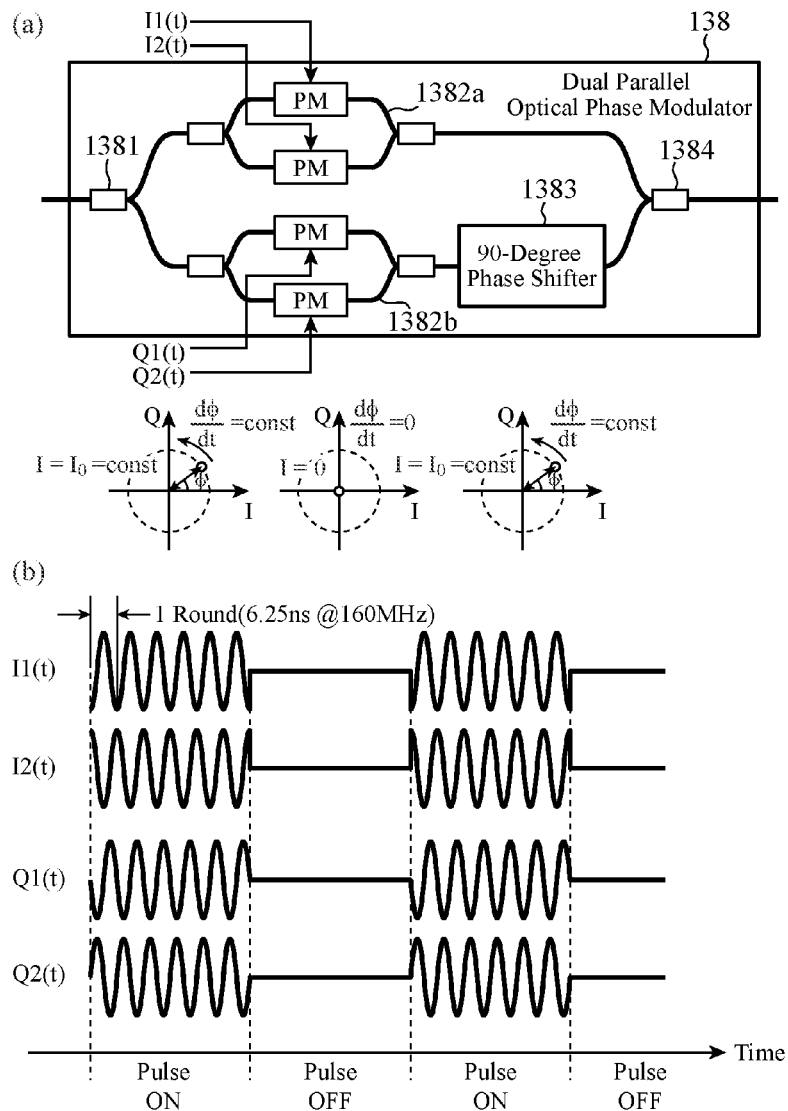
FIG. 28 is a diagram explaining the operation of a dual parallel phase modulator of the laser radar device in accordance with Embodiment 9 of the present invention.

Next, the structure and the operation of the dual parallel optical phase modulator 138 will be explained by referring to FIG. 28.

The dual parallel optical phase modulator 138 is comprised of a branching coupler 1381, first and second MZ (Mach Zehnder) modulators 1382a and 1382b, a 90-degree phase shifter 1383, and a combining coupler 1384, as shown in FIG. 28(a).

In the operation of the dual parallel optical phase modulator 138, first, the branching coupler 1381 branches the light from the optical path branching coupler 12 into lights.

The driving signals $I1(t)$ and $I2(t)$ each having an amplitude of a $V\pi$ voltage (a voltage which causes a phase change of 180 degrees in the first MZ modulator 1382a) and having a phase difference of 180 degrees between them are applied to the two signal input ends of the first MZ modulator 1382a. As a result, the first MZ modulator 1382a is driven to modulate one of the lights after being branched by the branching coupler 1381. At that time, the output of the first MZ modulator 1382a varies vibrationally within a range of ±1 on a horizontal axis I in a complex plane shown in an upper portion of FIG. 28(b).

Further, the driving signals $Q1(t)$ and $Q2(t)$ each having an amplitude of a $V\pi$ voltage (a voltage which causes a phase change of 180 degrees in the second MZ modulator 1382b) and having a phase difference of 180 degrees between them are applied to the two signal input ends of the second MZ modulator 1382b. As a result, the second MZ modulator 1382b is driven to modulate the other light after being branched by the branching coupler 1381. At that time, the output of the 90-degree phase shifter 1383 connected, as the following stage, to the second MZ modulator 1382b varies vibrationally within a range of ±1 on a vertical axis Q in the complex plane shown in the upper portion of FIG. 28(b).

After that, the 90-degree phase shifter 1383 shifts the phase of the light modulated by the second MZ modulator 1382b by 90 degrees, and the combining coupler 1384 combines the light modulated by the first MZ modulator 1382a and the light whose phase is shifted by 90 degrees by the 90-degree phase shifter 1383 and outputs these lights as a transmission light.

The phase difference between the driving signal $I1(t)$ and the driving signal $Q1(t)$ and the phase difference between the driving signal $I2(t)$ and the driving signal $Q2(t)$ are set to 90 degrees, to drive the first and second MZ modulators 1382a and 1382b. Then, the complex amplitude of the combined output acquired by the combining coupler 1384 is made to perform a constant angular speed movement at an angular speed at which to make one round, with the period of the sine wave signal, around the circumference of a normalized circle in the complex plane shown in the upper portion of FIG. 28(b).

At that time, the frequency of each of the sinusoidal waves of the driving signals $I1(t)$, $I2(t)$, $Q1(t)$ and $Q2(t)$ is made to match a frequency shift quantity needed for the laser radar device. As a result, the desired frequency shift can be provided for the output light signal.

Further, the pulse modulation driving signal WF01 from the first signal generator 133 is multiplied by the sine wave driving signals from the fourth to seventh signal generators 139a to 139d by the signal multipliers 136a to 136d, so that time series waveforms shown in a lower portion of FIG. 28(b) are acquired. More specifically, the dual parallel optical phase modulator 138 is driven during the pulse on time intervals by using the four sine wave driving signal waveforms whose frequencies match the desired shift frequency and among which the relative phase difference of 90 degrees is maintained. Further, during the pulse off time intervals, the amplitudes of all the four signals are fixed to zero.

As a result, the complex amplitude of the output of the dual parallel optical phase modulator 138 makes it possible to implement desired pulse modulation in the complex plane shown in the upper portion of FIG. 28(b). More specifically, the output has a constant amplitude and a constant angular speed (constant intensity and constant offset frequency) during the pulse on time intervals, while the output has an amplitude of zero and an angular speed of zero (intensity of zero and offset frequency of zero) during the pulse off time intervals.

As a result, a second signal generator 134 and a next-stage optical intensity modulator (a semiconductor light amplifier or an LN intensity modulator) 132 which are needed for the laser radar device in accordance with any of Embodiments 3 and 4 become unnecessary. Therefore, the structure of the driving circuit and the optical circuit are simplified, and this simplification contributes to a cost reduction.

Further, it is expected that there will be a growing need for multi-level modulation (QPSK, QAM) in the field of optical communications, and, from now on, the number of dual parallel optical phase modulators 138 which will be commercially available will increase as compared with the number of single optical phase modulators (optical phase modulators 131) which are commercially available. Therefore, an advantage of achieving a cost reduction according to economies of scale in manufacturing is expected.

In addition, there is a high possibility that a module (including standardization) in which a reference light source 11, an optical path branching coupler 12, and a dual parallel optical phase modulator 138 are accommodated into the same package will be developed in the near future. As a result, an advantage of contributing to downsizing and a cost reduction is expected.

Further, there is a possibility that, as a future technique, the present invention is applied also to silicon photonics of producing an electronic circuit and an optical circuit on a silicon wafer by performing the same process. As a result, there is provided an advantage of contributing to further downsizing, further low power consumption, and a further cost reduction.

Hereafter, the operation of the optical phase modulator 131 in accordance with Embodiment 3 will be additionally explained, as a reference example, on a complex plane of FIG. 29. FIG. 29(a) shows an extract of only the optical phase modulator 131 and the optical intensity modulator (SOA) 132 from the structure in accordance with Embodiment 3.

As shown in this FIG. 29(a), a signal I_PM(t) which is a burst-like saw tooth wave driving signal WF04 is inputted to the optical phase modulator 131, and a signal I_IM(t) which is a pulse modulation driving signal WF01 is inputted to the optical intensity modulator 132.

Then, during the pulse on time intervals of the pulse modulation driving signal WF01, the amplitude of the saw tooth wave driving signal WF04 is set to an integral multiple of a $2V\pi$ voltage (a voltage which causes a phase change of 180 degrees in the optical phase modulator 131). In this case, the complex amplitude at the output end of the optical phase modulator 131 performs a constant angular speed movement around the circumference of a normalized circle on a complex plane shown in an upper portion of FIG. 29(b), like in the case shown in FIG. 28. It is seen from the diagram that because the temporal change of the phase is constant, a frequency shift having a constant value can be made to occur.

On the other hand, during the pulse off time intervals of the pulse modulation driving signal WF01, the waveform of the saw tooth wave driving signal WF04 is held at zero. In this case, the complex amplitude at the output end of the optical phase modulator 131 is held at a point of intersection between a normalized circle and a horizontal axis (positive value) on a complex plane in the upper portion of FIG. 29(b).

Therefore, the complex amplitude at the output end of the optical phase modulator 131 has a constant angular speed (constant intensity and constant offset frequency) during the pulse on time intervals and has a phase of 0 (however, the intensity≠0) during the pulse off time intervals, and these features are repeated with time.

Therefore, in Embodiment 3, it is necessary to forcedly make the amplitude equal to zero during the pulse off time intervals, and it is therefore necessary to use the next-stage intensity modulator 132.

In the above-mentioned example, the structure in which the dual parallel optical phase modulator 138 is added to the structure of the optical transmitter 1 in accordance with Embodiment 3 shown in FIG. 8 is shown. In contrast with this, the dual parallel optical phase modulator 138 can be added to the structure of the optical transmitter 1 in accordance with Embodiment 4 shown in FIG. 10. In this case, the same advantages can be provided.

Further, although the case in which the dual parallel optical phase modulator 138 is used is shown above, any other optical phase amplitude modulator can be applied similarly as long as the optical phase amplitude modulator simultaneously modulates the phase and the amplitude of the light from the optical path branching coupler 12 and then outputs the light as the transmission light.

In addition, while the invention has been described in its preferred embodiments, it is to be understood that an arbitrary combination of two or more of the embodiments can be made, various changes can be made in an arbitrary component in accordance with any one of the embodiments, and an arbitrary component in accordance with any one of the embodiments can be omitted within the scope of the invention.

INDUSTRIAL APPLICABILITY

The laser radar device in accordance with the present invention performs a frequency shift and pulsing which are needed for the transmit side without using any AO modulator, thereby being able to achieve downsizing and integration thereof, and an improvement in the reliability and a cost reduction according to a reduction in the component count, and is suitable for use as a laser radar device or the like that performs remote measurement of wind directions and speeds in, for example, weather space.

EXPLANATIONS OF REFERENCE NUMERALS

1 optical transmitter, 2 optical amplifier, 3 optical circulator, 4, 4a, and 4b optical antenna unit (optical antenna), 5 optical heterodyne receiver, 6 signal processor, 7 display, 8 wavelength demultiplexing coupler, 11, 11a, and 11b reference light source, 12 optical path branching coupler, 13 optical frequency and intensity modulator, 14 wavelength multiplexing coupler, 15 optical switch, 131 optical phase modulator, 132 optical intensity modulator, 133 first signal generator, 134 second signal generator, 135 second optical intensity modulator, 136, and 136a to 136d signal multiplier (third signal generator), 137 signal arithmetic operator, 138 dual parallel optical phase modulator (optical phase amplitude modulator), 139a to 139d fourth to seventh signal generators, 1381 branching coupler, 1382a and 1382b first and second MZ modulators, 1383 90-degree phase shifter, and 1384 combining coupler.

The invention claimed is:

1. A laser radar device provided with an optical transmitter to output both a local oscillating light which is a continuously oscillating light and a transmission light, an optical antenna to emit the transmission light outputted by said optical transmitter into space, and to receive, as a received light, a backscattered light associated with said transmission light, an optical heterodyne receiver to perform optical heterodyne detection by using both the local oscillating light outputted by said optical transmitter and the received light received by said optical antenna, and a signal processor to perform a frequency analysis on a result of the detection performed by said optical heterodyne receiver, wherein said optical transmitter comprises:
an optical phase modulator to perform phase modulation on said continuously oscillating light;
an optical intensity modulator to perform pulse modulation on the light on which the phase modulation is performed by said optical phase modulator, to output the light as said transmission light;
a first signal generator to generate a pulse modulation driving signal in which on and off time intervals are repeated periodically, to drive said optical intensity modulator;
a second signal generator to generate a saw tooth wave driving signal having an amplitude equal to an integral multiple of a driving voltage needed to acquire a modulation phase of $2\pi$ of said optical phase modulator, and having a constant period, to drive said optical phase modulator; and
a third signal generator that outputs a burst-like saw tooth wave driving signal in which portions corresponding to pulse on time intervals of the pulse modulation driving signal generated by said first signal generator are extracted from the saw tooth wave driving signal generated by said second signal generator, to drive said optical phase modulator on behalf of said second signal generator.

2. The laser radar device according to claim 1, wherein said laser radar device includes an optical path branching coupler that branches the continuously oscillating light on which the phase modulation is performed by said optical phase modulator into two lights, and outputs one of the two lights as said local oscillating light and outputs the other one of the two lights as said transmission light, and wherein said optical intensity modulator performs the pulse modulation on the light, which is used as said transmission light, from said optical path branching coupler.

3. The laser radar device according to claim 1, wherein said laser radar device includes a signal arithmetic operator that estimates a frequency deviation during a pulse on time interval from the pulse modulation driving signal generated by said first signal generator, and that controls driving of said second signal generator in such a way as to compensate for an influence of said frequency deviation upon said transmission light.

4. The laser radar device according to claim 3, wherein said signal arithmetic operator does not drive said second signal generator during a time interval that a temporal change rate of intensity of said pulse modulation driving signal is non-zero.

5. The laser radar device according to claim 3, wherein said signal arithmetic operator controls said second signal generator in such a way as to generate the saw tooth wave driving signal having a period which is a result of subtracting said frequency deviation from an offset frequency which is provided for said transmission light.

6. The laser radar device according to claim 1, wherein said optical transmitter includes a plurality of reference light sources that generate continuously oscillating lights having different wavelengths, and a wavelength multiplexing coupler that performs wavelength multiplexing on the continuously oscillating lights generated by said reference light sources, and said optical phase modulator performs the phase modulation on the continuously oscillating lights on which the wavelength multiplexing is performed by said wavelength multiplexing coupler, and wherein said laser radar device includes a wavelength demultiplexing coupler that demultiplexes the transmission light outputted by said optical transmitter into transmission lights having different wavelengths, and a plurality of said optical antennas are disposed respectively while being brought into correspondence with said reference light sources, and use the transmission lights having corresponding wavelengths after being demultiplexed by said wavelength demultiplexing coupler.

7. The laser radar device according to claim 6, wherein before switching between wavelengths, said optical transmitter also switches on said reference light source which is a switching destination, waits a time interval during which a wavelength of said reference light source corresponding to a wavelength after the switching becomes a stable state, and, after said wavelength becomes the stable state, switches off said reference light source corresponding to a wavelength before the switching.

8. The laser radar device according to claim 6, wherein when switching between wavelengths, said optical transmitter switches off said reference light source corresponding to a wavelength before the switching and switches on said reference light source corresponding to a wavelength after the switching, and at a time of said wavelength switching said second signal generator generates the saw tooth wave driving signal having a period corresponding to a frequency temporal change caused by an unstable state of a wavelength of said reference light source corresponding to the wavelength after the switching.

9. The laser radar device according to claim 1, wherein said optical transmitter includes a plurality of reference light sources that generate continuously oscillating lights having different wavelengths, and an optical switch that selectively outputs the continuously oscillating light generated by each of said reference light sources, and said optical phase modulator performs the phase modulation on the continuously oscillating light outputted by said optical switch, and wherein said laser radar device includes a wavelength demultiplexing coupler that demultiplexes the transmission light outputted by said optical transmitter into transmission lights having different wavelengths, and a plurality of said optical antennas are disposed respectively while being brought into correspondence with said reference light sources, and use the transmission lights having corresponding wavelengths after being demultiplexed by said wavelength demultiplexing coupler.

10. A laser radar device provided with an optical transmitter to output both a local oscillating light which is a continuously oscillating light and a transmission light, an optical antenna to emit the transmission light outputted by said optical transmitter into space, and to receive, as a received light, a backscattered light associated with said transmission light, an optical heterodyne receiver to perform optical heterodyne detection by using both the local oscillating light outputted by said optical transmitter and the received light received by said optical antenna, and a signal processor to perform a frequency analysis on a result of the detection performed by said optical heterodyne receiver, wherein said optical transmitter comprises:
an optical phase amplitude modulator to simultaneously modulate a phase and an amplitude of said continuously oscillating light, to output this continuously oscillating light as said transmission light;
a first signal generator to generate a pulse modulation driving signal in which on and off time intervals are repeated periodically;
fourth to seventh signal generators to generate sine wave driving signals each having an amplitude equal to a driving voltage needed to acquire a modulation phase of 180 degrees of said optical phase amplitude modulator, and having a constant period, in such a way that the sine wave driving signals have a relation of a 90-degree phase difference among them; and
a third signal generator to output burst-like sine wave driving signals in each of which portions corresponding to pulse on time intervals of the pulse modulation driving signal generated by said first signal generator are extracted from one of the sine wave driving signals generated by said fourth to seventh signal generators, to drive said optical phase amplitude modulator.

11. The laser radar device according to claim 10, wherein said optical phase amplitude modulator is a dual parallel optical phase modulator, the sine wave driving signals generated by said fourth and fifth signal generators have a phase difference of 180 degrees therebetween, and the sine wave driving signals generated by said sixth and seventh signal generators have a phase difference of 180 degrees therebetween, and wherein said dual parallel optical phase modulator comprises:
a branching coupler to branch said continuously oscillating light;
a first MZ (Mach Zehnder) modulator to be driven according to the sine wave driving signals which are generated by said fourth and fifth signal generators and which are processed by said third signal generator, and to modulate one continuously oscillating light after being branched by said branching coupler;
a second MZ (Mach Zehnder) modulator to be driven according to the sine wave driving signals which are generated by said sixth and seventh signal generators and which are processed by said third signal generator, and to modulate another continuously oscillating light after being branched by said branching coupler;
a 90-degree phase shifter to shift a phase of the continuously oscillating light modulated by said second MZ modulator by 90 degrees; and
a combining coupler to combine the continuously oscillating light modulated by said first MZ modulator and the continuously oscillating light whose phase is shifted by 90 degrees by said 90-degree phase shifter.

* * * * *